US009200701B2

(12) United States Patent
Sekii et al.

(10) Patent No.: US 9,200,701 B2
(45) Date of Patent: Dec. 1, 2015

(54) VEHICLE TRANSMISSION APPARATUS

(75) Inventors: Takahiro Sekii, Anjo (JP); Takehiko Suzuki, Toyota (JP)

(73) Assignee: AISIN AW CO., LTD., Anjo (JP)

( * ) Notice: Subject to any disclaimer, the term of this patent is extended or adjusted under 35 U.S.C. 154(b) by 382 days.

(21) Appl. No.: 13/051,328

(22) Filed: Mar. 18, 2011

(65) Prior Publication Data

US 2011/0239800 A1 Oct. 6, 2011

(30) Foreign Application Priority Data

Mar. 31, 2010 (JP) .................................. 2010-083695

(51) Int. Cl.
| F16H 61/04 | (2006.01) |
|---|---|
| F16H 61/02 | (2006.01) |
| F16H 63/50 | (2006.01) |
| F16H 59/18 | (2006.01) |
| F16H 59/44 | (2006.01) |

(52) U.S. Cl.
CPC ............ *F16H 61/0213* (2013.01); *F16H 63/50* (2013.01); *F16H 59/18* (2013.01); *F16H 59/44* (2013.01); *F16H 2061/0448* (2013.01); *F16H 2312/14* (2013.01); *Y10T 74/20018* (2015.01)

(58) Field of Classification Search
None
See application file for complete search history.

(56) References Cited

U.S. PATENT DOCUMENTS

| 6,138,070 | A | 10/2000 | Shimanaka et al. | |
|---|---|---|---|---|
| 6,679,808 | B2 | 1/2004 | Tanaka et al. | |
| 6,997,843 | B2 | 2/2006 | Saitou | |
| 7,285,071 | B2 * | 10/2007 | Nakajima et al. | 477/107 |
| 7,469,758 | B2 * | 12/2008 | Iwanaka et al. | 180/65.1 |
| 7,892,141 | B2 | 2/2011 | Yamaguchi et al. | |
| 2007/0114081 | A1 | 5/2007 | Iwanaka et al. | |
| 2008/0139364 | A1 * | 6/2008 | Lee | 477/143 |
| 2008/0168964 | A1 * | 7/2008 | Kimura et al. | 123/325 |
| 2011/0183809 | A1 * | 7/2011 | Rangaraju et al. | 477/120 |
| 2011/0275479 | A1 * | 11/2011 | Atmaram et al. | 477/174 |

FOREIGN PATENT DOCUMENTS

| EP | 1 431 625 A1 | 6/2004 |
|---|---|---|
| JP | B2-56-48693 | 11/1981 |
| JP | A-H11-063193 | 3/1999 |
| JP | A-2001-115867 | 4/2001 |
| JP | A-2002-106696 | 4/2002 |
| JP | A-2006-170295 | 6/2006 |
| JP | A-2008-151198 | 7/2008 |

OTHER PUBLICATIONS

Apr. 5, 2011 International Search Report issued in PCT/JP2011/052613 (with translation).
Nov. 7, 2013 Office Action issued in Japanese Patent Application No. 2010-083695 (with translation).

* cited by examiner

Primary Examiner — Erin D Bishop
(74) Attorney, Agent, or Firm — Oliff PLC

(57) ABSTRACT

A vehicle transmission apparatus configured such that when transitioning to an actual traveling state by forming one of the shift speeds from a free running state in which a vehicle is in a traveling state and the speed change mechanism is in a neutral state with none of the shift speeds formed, the control device performs a control to determine from the plurality of shift speeds one final target shift speed according to at least a vehicle speed and a driver request, and an intermediate target shift speed with a speed ratio smaller than that of the final target shift speed, and to form the final target shift speed after formation of the intermediate target shift speed.

11 Claims, 7 Drawing Sheets

|  | C1 | C2 | C3 | B1 | B2 | F |
|---|---|---|---|---|---|---|
| Ntl |  |  |  |  |  |  |
| 1st | ○ |  |  |  |  | △ |
| 2nd | ○ |  |  | ○ |  |  |
| 3rd | ○ |  | ○ |  |  |  |
| 4th | ○ | ○ |  |  |  |  |
| 5th |  | ○ | ○ |  |  |  |
| 6th |  | ○ |  | ○ |  |  |
| Rev |  |  | ○ |  | ○ |  |

VEHICLE TRANSMISSION APPARATUS

INCORPORATION BY REFERENCE

The disclosure of Japanese Patent Application No. 2010-083695 filed on Mar. 31, 2010 including the specification, drawings and abstract is incorporated herein by reference in its entirety.

BACKGROUND OF THE INVENTION

The present invention relates to a vehicle transmission apparatus that includes: an input member drive-coupled to an engine; an output member drive-coupled to a wheel; a speed change mechanism that includes a plurality of engagement elements and a plurality of shift speeds selectively formed by controlling the engagement and release of the plurality of engagement elements, and changes a rotation speed of the input member at a speed ratio of one of the shift speeds and transmits the changed rotation speed to the output member; and a control device that controls at least the speed change mechanism.

DESCRIPTION OF RELATED ART

Among vehicle transmission apparatuses according to related art, there is one that automatically starts and stops operation of an engine under predetermined conditions so as to reduce fuel consumption. For example, an apparatus described in Japanese Patent Publication No. S56-48693 listed below is already known. According to the art disclosed in S56-48693, in a vehicle having an automatic transmission, starting of the engine is initiated when depression of an accelerator pedal is detected, and such starting of the engine is continued when it is detected that a depression rate of the accelerator pedal is equal to or lower than a predetermined value. In the vehicle having the automatic transmission, starting of the engine is also initiated when it is detected that a depression amount of the accelerator pedal is a first set amount, and such starting of the engine is continued when it is detected that the depression amount of the accelerator pedal is a second set amount that is larger than the first set amount.

SUMMARY OF THE INVENTION

The transmission apparatus according to the related art aims to reduce the fuel consumption while the vehicle is stopped, and cannot be adapted to improving the fuel consumption rate by automatically starting and stopping the engine while the vehicle is traveling. In addition, the transmission apparatus according to the related art cannot be adapted to achieving a gradual deceleration and reduction in fuel consumption during a gradual decelerating operation, in which a requested driving force from a driver is quite small, by controlling the transmission apparatus to a neutral state and automatically stopping the engine. The transmission apparatus according to the related art also cannot be adapted to achieving a favorable vehicle acceleration when the requested driving force from the driver increases during the gradual decelerating operation, by performing a control that automatically starts the engine and forms a shift speed in the transmission apparatus.

Accordingly, a vehicle transmission apparatus is desired that is capable of reducing a period until a shift speed is formed from a neutral state after a requested driving force from a driver increases and a vehicle changes to an acceleration operating state, thereby improving a response speed with respect to an acceleration request from the driver.

A vehicle transmission apparatus according to the present invention for achieving the above includes: an input member drive-coupled to an engine; an output member drive-coupled to a wheel; a speed change mechanism that includes a plurality of engagement elements and a plurality of shift speeds selectively formed by controlling the engagement and release of the plurality of engagement elements, and changes a rotation speed of the input member at a speed ratio of one of the shift speeds and transmits the changed rotation speed to the output member; and a control device that controls at least the speed change mechanism. In the vehicle transmission apparatus, when transitioning to an actual traveling state by forming one of the shift speeds from a free running state in which a vehicle is in a traveling state and the speed change mechanism is in a neutral state with none of the shift speeds formed, the control device performs a control to determine from the plurality of shift speeds one final target shift speed according to at least a vehicle speed and a driver request, and an intermediate target shift speed with a speed ratio smaller than that of the final target shift speed, and to form the final target shift speed after formation of the intermediate target shift speed.

Note that in the present application, the "vehicle in a traveling state" refers to a state in which the vehicle speed is not zero. The "driver request" in the present application includes at least a requested driving force based on an operation of an accelerator pedal by the driver or the like, and selection of a shift speed based on a manual shift operation by the driver or the like.

The "speed ratio" in the present application is a ratio between a rotation speed of the input member and a rotation speed of the output member, and defined by the number of teeth of gears or the like that form each shift speed when the shift speeds are formed in the speed change mechanism. In the present application, the speed ratio is a value obtained by dividing the rotation speed of the input member by the rotation speed of the output member.

In the present application, "drive-coupled" refers to a state in which two rotation elements are coupled in a manner capable of transmitting a driving force, and is used as a concept that includes a state in which the two rotation elements are coupled so as to integrally rotate and a state in which the two rotation elements are coupled in a manner capable of transmitting a driving force via one or more transmission members. Such transmission members include various types of members that transmit a rotation without changing its speed or after changing its speed, and include a shaft, a gear mechanism, a friction engagement element, a belt, and a chain, for example.

In a transmission apparatus such as the vehicle transmission apparatus according to the present invention which is capable of changing to a free running state in which the speed change mechanism is set to neutral while the vehicle is traveling, when a shift speed is formed from this free running state, a control is performed to form the shift speed after allowing the rotation speed of the input member to reach the vicinity of a target rotation speed that is determined based on a vehicle speed and a speed ratio, in order to suppress large fluctuations in the driving force transmitted to the wheel. Here, the target rotation speed of the input member is a rotation speed obtained by multiplying the rotation speed of the output member by the speed ratio of the shift speed. Therefore, assuming that the rotation speed of the output member remains the same, a larger speed ratio of the shift speed is accompanied by a higher target rotation speed of the input member. A higher target rotation speed of the input member results in a longer period until the rotation speed of the input member reaches this target rotation speed when transitioning from a free running state to an actual traveling state. Particularly if the final target shift speed is determined to be a shift speed with a large speed ratio when there is a large requested driving force serving as a driver request or if the driver selects a low gear speed, the target rotation speed of the final target shift speed increases and lengthens the period until the rotation speed of the input member reaches this target rotation speed. Thus, a larger acceleration request from the driver causes a longer delay until the acceleration is felt by the driver.

In the above-described characteristic configuration, a shift speed with a speed ratio smaller than the speed ratio of the final target shift speed is determined as the intermediate target shift speed. The target rotation speed of the input member for the intermediate target shift speed is lower than the target rotation speed of the input member for the final target shift speed. Thus, when transitioning from a free running state to an actual traveling state, a period until the rotation speed of the input member reaches the vicinity of the target rotation speed for the intermediate target shift speed is shorter than a period until the rotation speed of the input member reaches the target rotation speed for the final target shift speed. Therefore, when transitioning from a free running state to an actual traveling state, a period until torque in an accelerating direction (positive torque) can be transmitted to the output member can be significantly reduced compared to directly forming the final target shift speed, which improves a response speed to an acceleration request from the driver.

Here, in a preferred configuration, the control device determines a shift speed with a smallest speed ratio among the plurality of shift speeds as the intermediate target shift speed.

According to this configuration, the target rotation speed of the intermediate target shift speed can be lowered as much as possible. Thus, the shortest period until the rotation speed of the input member reaches the vicinity of the target rotation speed of the intermediate target shift speed can be achieved. Therefore, it is possible to achieve the shortest period until torque in an accelerating direction (positive torque) can be transmitted to the output member when transitioning from a free running state to an actual traveling state.

Here, in a preferred configuration, the control device determines two or more shift speeds among the plurality of shift speeds as the intermediate target shift speed, and performs a control to sequentially form the shift speeds, starting with the shift speed with the smaller speed ratio among the two or more intermediate target shift speeds and forming the final target shift speed last.

According to this configuration, an interval between points at which the rotation speed of the input member reaches the vicinity of the target rotation speed of the respective shift speeds determined as the intermediate target shift speed and the final target shift speed and each shift speed is formed can be appropriately reduced. Therefore, an interval between points at which torque in an accelerating direction (positive torque) can be transmitted to the output member when transitioning from a free running state to an actual traveling state can be appropriately reduced, which improves the response speed to an acceleration request from the driver.

Here, in another preferred configuration, when an acceleration request from the driver is received while in a free running state, the control device makes a determination to transition to an actual traveling state.

According to this configuration, after the acceleration request from the driver is received, a shift speed can be formed in a short period to transmit torque in an accelerating direction (positive torque) to the output member. Thus, the response speed to an acceleration request from the driver can be improved.

Here, in another preferred configuration, when transitioning to an actual traveling state while the engine is in a stopped state with the vehicle in a free running state, the control device performs a control to start the engine before formation of the intermediate target shift speed.

According to this configuration, at a point when the intermediate target shift speed is formed, the engine is in an operating state and torque generated by the engine can be transmitted to the wheel.

In a vehicle with a hydraulic pump that is driven by the driving force of an engine to generate a hydraulic pressure that is supplied to a transmission apparatus, according to the above-described configuration, the hydraulic pressure can be generated by the hydraulic pump before transitioning to an actual traveling state, and the engagement and release of a plurality of engagement elements in the transmission apparatus can be reliably performed.

DETAILED DESCRIPTION OF THE EMBODIMENTS

1. First Embodiment

A first embodiment of a vehicle transmission apparatus 1 according to the present invention will be described based on the drawings. In the present embodiment, an example will be described in which the vehicle transmission apparatus 1 according to the present invention is applied to a vehicle that includes an engine as a source of driving force. The vehicle transmission apparatus 1 is simply referred to as a "transmission apparatus 1" below.

Figure 1:
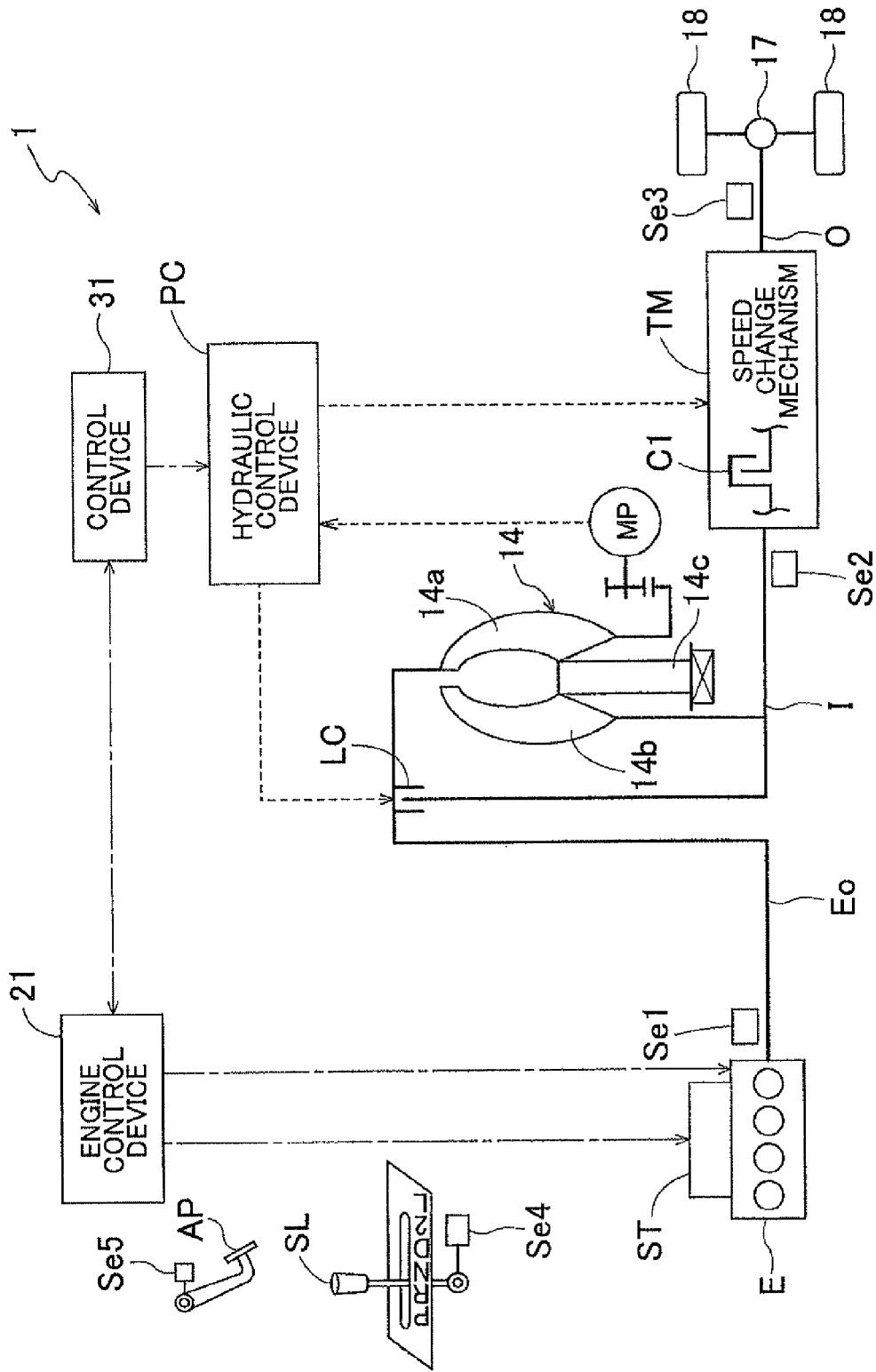
FIG. 1 is a schematic diagram that shows the configuration of a vehicle transmission apparatus according to an embodiment of the present invention.

FIG. 1 is a schematic diagram that shows the overall configuration of the vehicle that includes the transmission apparatus 1 according to the present embodiment. In FIG. 1, a solid line denotes a transmission path of driving force (torque), a dashed line denotes an instruction pressure of hydraulic oil or a supply path of hydraulic oil, and a dasheddotted line denotes a transmission path of an electrical signal. As illustrated in this diagram, the transmission apparatus 1 according to the present embodiment generally has a configuration that includes: an input shaft I drive-coupled to an engine E as a source of driving force; an output shaft O drive-coupled to a wheel 18; a speed change mechanism TM that has a plurality of shift speeds, and changes a rotation speed of the input shaft I at a speed ratio (reduction ratio) of one of the shift speeds and transmits the changed rotation speed to the output shaft O; and a control device 31 for the transmission apparatus 1 that controls at least the speed change mechanism TM. Here, the speed change mechanism TM includes a plurality of engagement elements, and the plurality of shift speeds of the speed change mechanism TM is selectively formed by controlling the engagement and release of the plurality of engagement elements. As illustrated in FIG. 1, the input shaft I of the transmission apparatus 1 is drive-coupled to the engine E via a torque converter 14 and an engine output shaft Eo. This transmission apparatus I also includes a hydraulic control device PC that is controlled by the control device 31 so as to supply hydraulic oil at an instruction pressure to hydraulically-actuated units such as the speed change mechanism TM and the torque converter 14. Note that the input shaft I corresponds to an "input member" of the present invention, the output shaft O corresponds to an "output member" of the present invention, and the control device 31 corresponds to a "control device" of the present invention.

The transmission apparatus 1 includes an input shaft rotation speed sensor Se2 and an output shaft rotation speed sensor Se3 that detect rotation speeds of the input shaft I and the output shaft O, respectively. The transmission apparatus 1 also includes an accelerator operation amount sensor Se5 that detects an operation amount of an accelerator pedal AP, which accepts a requested driving force from a driver as a driver request. The transmission apparatus 1 further includes a shift position sensor Se4 that detects a selected position (hereinafter referred to as a "shift position") of a shift lever SL as a driver request. Outputs of the sensors Se2 to Se5 are input to the control device 31.

1-1. Engine

The engine E is an internal combustion engine driven by the combustion of fuel, for which various types of commonly known engines such as a gasoline engine and a diesel engine can be used, for example. The engine E includes an engine control device 21 that controls the engine E to a predetermined driving state. The engine E also includes a starter ST for starting the engine E. The starter ST is formed of a direct-current motor or the like, and electrically connected to a battery not shown in the drawings. The starter ST is configured so as to be driven by electric power supplied from the battery in a state where the engine E is stopped, in order to rotate the engine output shaft Eo and start the engine E. In the present example, the engine output shaft Eo, which is a crankshaft of the engine E or the like, is drive-coupled to the input shaft via the torque converter 14.

1-2. Torque Converter

The torque converter 14 is a device that transmits a rotary driving force of the engine output shaft Eo of the engine E to the speed change mechanism TM via the input shaft I. This torque converter 14 includes a pump impeller 14a as an input-side rotation member that is drive-coupled to the engine output shaft Eo, a turbine runner 14b as an output-side rotation member that is drive-coupled to the input shaft I, and a stator 14c that is interposed between the pump impeller 14a and the turbine runner 14b and has a one-way clutch. The torque converter 14 transmits a driving force between the pump impeller 14a on the input side (driving side) and the turbine runner 14b on the output side (driven side) via hydraulic oil provided therein. Accordingly, a torque difference and a rotation speed difference normally occur between the rotation shafts of the driving side and the driven side. However, since the torque converter 14 includes the stator 14c having the one-way clutch, the torque converter 14 transmits the driving force from the input side to the output side, but does not transmit the driving force from the output side to the input side.

This torque converter 14 includes a lock-up clutch LC as a friction engagement mechanism for locking up, This lock-up clutch LC is a clutch that couples the pump impeller 14a and the turbine runner 14b so that they rotate together, in order to eliminate a differential rotation (slip) between the pump impeller 14a and the turbine runner 14b and increase transmission efficiency. With the lock-up clutch LC in an engaged state, the torque converter 14 directly transmits the driving force of the engine E (engine output shaft Eo) to the speed change mechanism TM (input shaft I) without the intervention of hydraulic oil, and thus no torque difference or rotation speed difference occurs between the rotation shafts of the driving side and the driven side. This lock-up clutch LC operates upon supply of an instruction pressure of hydraulic oil from the hydraulic control device PC.

In this torque converter 14, similar to a torque converter of a general automatic transmission apparatus, the lock-up clutch LC is released when the shift speed of the speed change mechanism TM is switched, and transmission of the driving force is performed via hydraulic oil. As in the present embodiment, when a re-engagement control is performed to form a shift speed and transition to an actual traveling state from a free running state in which the speed change mechanism TM is in a neutral state with none of the shift speeds formed, the lock-up clutch LC is also set to a released state and the driving force is transmitted via hydraulic oil.

1-3. Speed Change Mechanism

The speed change mechanism. TM includes a plurality of engagement elements and a plurality of shift speeds selectively formed by controlling the engagement and release of the plurality of engagement elements. The speed change mechanism TM changes the rotation speed of the input shaft I at a speed ratio (reduction ratio) of each of the shift speeds and transmits the changed rotation speed to the output shaft O. The speed change mechanism TM is set to a neutral state in which none of the shift speeds are formed by releasing all the engagement elements.

To form the plurality of shift speeds, the speed change mechanism TM includes a gear mechanism such as a planetary gear mechanism as a rotation element for shifting, rotation members such as a rotation shaft and a hub, and friction engagement elements such as a clutch and a brake as the engagement elements. The friction engagement elements are each engagement elements formed having a friction material. It is possible to sequentially control an increase and decrease of a transfer torque capacity of these friction engagement elements by controlling a supplied hydraulic pressure. As such friction engagement elements, a wet multi-plate clutch, a wet multi-plate brake, a dry clutch, and a dry brake, for example, are preferably used. In FIG. 1, a first clutch C1 is schematically shown as an example of the friction engagement elements.

Each engagement element of the speed change mechanism TM operates upon supply of an instruction pressure of hydraulic oil from the hydraulic control device PC. Selectively switching between engagement and release of the plurality of engagement elements switches the transmitting state of the driving force to the plurality of rotation elements for shifting with which the gear mechanism is provided, thereby switching the shift speed. In a state where any of the shift speeds is formed, the speed change mechanism TM is in a transmitting state that transmits the rotation and torque of the input shaft I to the output shaft O. The speed change mechanism TM changes the rotation speed of the input shaft I at a predetermined speed ratio (reduction ratio) set for each shift speed, converts the torque thereof, and transmits both to the output shaft O. Here, the rotation speed of the input shaft I is called an input rotation speed, and the rotation speed of the output shaft O is called an output rotation speed. The torque of the input shaft I is called an input torque, and the torque of the output shaft O is called an output torque. A rotation speed obtained by dividing the input rotation speed by the speed ratio (reduction ratio) set for each shift speed is the output rotation speed, and a torque obtained by multiplying the input torque by the speed ratio (reduction ratio) set for each shift speed is the output torque. The driving force transmitted from the speed change mechanism TM to the output shaft O is transmitted to the wheel 18 via a differential device 17.

Meanwhile, as described above, releasing all the engagement elements puts the speed change mechanism TM in a neutral state in which none of the shift speeds are formed. In this neutral state, the speed change mechanism TM is in a non-transmitting state in which the rotation and torque of the input shaft I is not transmitted to the output shaft O. The release of each engagement element is performed by the hydraulic control device PC decreasing the instruction pressure of hydraulic oil supplied to that particular engagement element. In the present embodiment, each engagement element of the speed change mechanism TM is biased toward a release side by a reaction force of a spring provided in each engagement element. When a force generated by the hydraulic pressure supplied to each engagement element becomes lower than the reaction force of the spring, each engagement element achieves a released state due to the reaction force of the spring. In this released state, the transfer torque capacity of each engagement element becomes zero. In the present embodiment, the transmission apparatus 1 does not have an auxiliary hydraulic pressure supply source such as an electric oil pump. Thus, if a mechanical pump MP that is a hydraulic pressure supply source changes to a stopped state due to stopping of the engine E or the like, the hydraulic pressure decreases. The hydraulic pressures supplied to all the engagement elements consequently decrease even when the hydraulic control device PC is operating to supply the instruction pressure of hydraulic oil. In this state, all the engagement elements change to a released state, and the speed change mechanism TM achieves a neutral state.

Figures 2, 3:
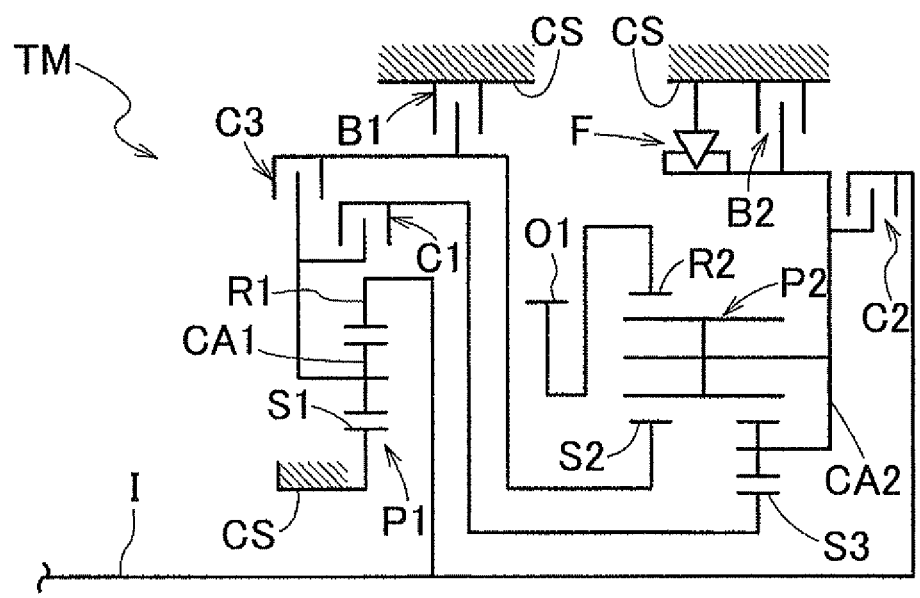
FIG. 2 is an example of a skeleton diagram of a speed change mechanism according to the embodiment of the present invention.
FIG. 3 is a drawing that shows an operation chart of the speed change mechanism according to the embodiment of the present invention.

FIG. 2 is a skeleton diagram of the speed change mechanism TM according to the present embodiment. As illustrated in this diagram, the speed change mechanism TM is configured to include a planetary gear unit formed by combining two planetary gear units P1, P2. The speed change mechanism TM also includes a plurality of engagement elements C1, C2, C3, B1, B2, F corresponding to rotation elements forming the planetary gear unit. Specifically, as these engagement elements, the speed change mechanism TM includes a first clutch C1, a second clutch C2, a third clutch C3, a first brake B1, a second brake B2, and a one-way brake F. In the present embodiment, the first clutch C1, the second clutch C2, the third clutch C3, the first brake B1, the second brake B2, and the one-way brake F constitute the "plurality of engagement elements" of the present invention.

FIG. 3 is a drawing that shows an operation chart of these engagement elements C1, C2, C3, B1, B2, F. In the present embodiment, the speed change mechanism TM includes six shift speeds (first speed, second speed, third speed, fourth speed, fifth speed, and sixth speed) with different speed ratios (reduction ratios) as forward speeds, and also includes one reverse speed. In FIG. 3, "1st" denotes the first speed, "2nd" denotes the second speed, "3rd" denotes the third speed, "4th" denotes the fourth speed, "5th" denotes the fifth speed, "6th" denotes the sixth speed, and "Rev" denotes the reverse speed. "Ntl" denotes a neutral state in which none of the shift speeds are formed. In the present embodiment, "Ntl" is called a neutral speed for convenience. In the operation chart shown in this drawing, a circle symbol indicates that an engagement element is in an engaged state. The absence of a symbol indicates that an engagement element is in a released state. A triangle symbol indicates operation of the one-way brake F. As shown in this operation chart, in the speed change mechanism TM according to the present embodiment, each shift speed is selectively formed by engaging any two engagement elements and releasing the other engagement elements at each shift speed. The speed change mechanism TM is configured such that in each of the shift speeds from the first speed to the sixth speed that form forward speeds, one engagement element common to two shift speeds with adjacent speed ratios is in an engaged state. Accordingly, when the shift speed is switched between two shift speeds with close speed ratios, simultaneous changeover of two engagement elements is not necessary. In the speed change mechanism TM according to the present embodiment, if all the engagement elements are changed to a released state, and if only one of the engagement elements is in an engaged state, none of the shift speeds are formed and a neutral state is achieved.

In the present embodiment, the first speed, the second speed, the third speed, the fourth speed, the fifth speed, and the sixth speed have speed ratios in a descending order of magnitude for transmitting the rotation of the input shaft I to the output shaft O. One of the first to sixth speeds is selected by the control device 31 when the D range is selected as the shift position. The reverse speed is selected by the control device 31 when the R range is selected as the shift position. The neutral speed is selected by the control device 31 when the P range or the N range is selected as the shift position. When the 2 range is selected, a low shift speed such as the first speed and the second speed is selected with priority by the control device 31. When the L range is selected, a low shift speed such as the first speed is selected with priority by the control device 31. When the mechanical pump MP is stopped, as will be described later, all the engagement elements of the speed change mechanism TM change to a released state, and the speed change mechanism TM changes to the state of the neutral speed.

Next, returning to FIG. 2, the skeleton diagram of the speed change mechanism TM in the present embodiment will be described. The first planetary gear unit P1 is a single-pinion type planetary gear mechanism disposed coaxially with the input shaft I. Specifically, the first planetary gear unit P1 is configured to have three rotation elements: a carrier CA1 that supports a plurality of pinion gears, and a sun gear S1 and a ring gear R1 that each mesh with the pinion gears. The second planetary gear unit P2 is a Ravigneaux type planetary gear mechanism disposed coaxially with the input shaft I. Specifically, the second planetary gear unit P2 is configured to have four rotation elements: two sun gears that are a first sun gear S2 and a second sun gear S3, a ring gear R2, and a common carrier CA2 that supports a long pinion gear meshing with both the first sun gear S2 and the ring gear R2 and short pinion gears meshing with the long pinion gear and the second sun gear S3.

The sun gear S1 of the first planetary gear unit P1 is fixed to a case CS that is a non-rotation member. The carrier CA1 is drive-coupled to the second sun gear S3 of the second planetary gear unit P2 via the first clutch C1 so as to selectively and integrally rotate therewith, and drive-coupled to the first sun gear S2 of the second planetary gear unit P2 via the third clutch C3 so as to selectively and integrally rotate therewith. The ring gear R1 is drive-coupled to the input shaft I so as to integrally rotate therewith, and drive-coupled to the carrier CA2 of the second planetary gear unit P2 via the second clutch C2 so as to selectively and integrally rotate therewith. The rotation speeds of these three rotation elements are in the order of the sun gear S1, the carrier CA1, and the ring gear R1.

The first sun gear S2 of the second planetary gear unit P2 is drive-coupled to the carrier CA1 of the first planetary gear unit P1 via the third clutch C3 so as to selectively and integrally rotate therewith. The carrier CA2 is drive-coupled to the input shaft I and the ring gear R1 of the first planetary gear unit P1 via the second clutch C2 so as to selectively and integrally rotate therewith, and selectively fixed to the case CS that is a non-rotation member via the second brake B2 or the one-way brake F. The ring gear R2 is drive-coupled to an output gear O1 so as to integrally rotate therewith. The second sun gear S3 is drive-coupled to the carrier CA1 of the first planetary gear unit P1 via the first clutch C1 so as to selectively and integrally rotate therewith. The rotation speeds of these four rotation elements are in the order of the first sun gear S2, the carrier CA2, the ring gear R2, and the second sun gear 53. The output gear O1 is drive-coupled to the output shaft O in FIG. 1. Here, the one-way brake F selectively fixes the carrier CA2 to the case CS by restricting rotation to only one direction. In the present example, the one-way brake F is configured so as to be in an engaged state when the carrier CA2 of the second planetary gear unit P2 has a negative rotation.

Figure 4:
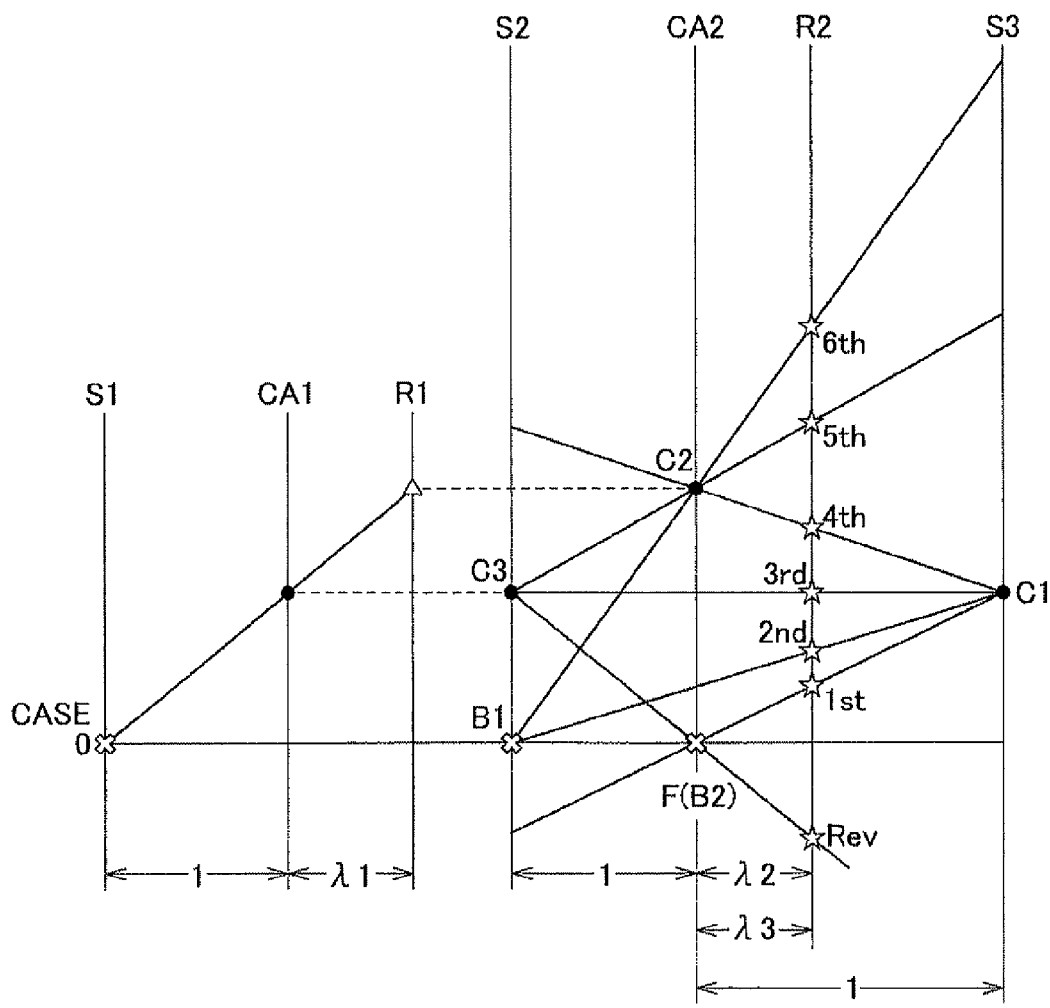
FIG. 4 is a drawing that shows a speed line diagram of the speed change mechanism according to the embodiment of the present invention.

FIG. 4 is a speed line diagram of the speed change mechanism TM. In this speed line diagram, the vertical axis corresponds to the rotation speeds of the rotation elements. Specifically, "0" written corresponding to the vertical axis indicates that the rotation speed is zero, with the side thereabove indicating a positive rotation (the rotation speed is positive) and the side therebelow indicating a negative rotation (the rotation speed is negative). A plurality of vertical lines arranged in parallel respectively correspond to the rotation elements of the first planetary gear unit P1 and the rotation elements of the second planetary gear unit P2. Specifically, vertical lines with "S1", "CA1", and "R1" written at the top correspond to the sun gear S1, the carrier CA1, and the ring gear R1 of the first planetary gear unit P1, respectively. Vertical lines with "S2", "CA2", "R2", and "S3" written at the top correspond to the first sun gear S2, the carrier CA2, the ring gear R2, and the second sun gear S3 of the second planetary gear unit P2, respectively. Intervals between the plurality of vertical lines disposed in parallel are defined based on a gear ratio $\lambda$ of the planetary gear units P1, P2 (gear ratio of sun gear and ring gear=[number of teeth of sun gear]/[number of teeth of ring gear]).

A triangle symbol indicates a state in which the engine E and the input shaft I are drive-coupled to the rotation element. An X symbol indicates a state in which the rotation element is fixed to the case CS by the first brake B1, the second brake B2, or the one-way brake F. A star symbol indicates a state in which the wheel 18 and the output shaft O are drive-coupled to the rotation element. "1st", "2nd", "3rd", "4th", "5th", "6th", and "Rev" written next to the star symbols correspond to the first speed, the second speed, the third speed, the fourth speed, the fifth speed, the sixth speed, and the reverse speed, respectively, which are achieved by the speed change mechanism TM.

As illustrated in FIGS. 3 and 4, the first speed is achieved by engagement of the first clutch C1 and the one-way brake F in a cooperative manner. Specifically, with the first clutch C1 in an engaged state, the rotation driving force of the input shaft I (engine E) input to the ring gear R1 of the first planetary gear unit P1 is decelerated based on a gear ratio $\lambda 1$ and transmitted to the second sun gear S3 of the second planetary gear unit P2. Then, with the first clutch C1 in an engaged state, when the rotation and driving force from the input shaft I (engine E) to the output shaft O are transmitted and the carrier CA2 of the second planetary gear unit P2 attempts to negatively rotate, the one-way brake F changes to an engaged state and fixes the carrier CA2 to the case CS, such that the rotation and driving force of the second sun gear S3 are decelerated based on a gear ratio $\lambda 3$ and transmitted to the output shaft O. When the rotation and driving force from the output shaft O to the input shaft I (engine E) are transmitted and the carrier CA2 of the second planetary gear unit P2 positively rotates, the one-way brake F is in a released state. The first speed thus achieved is a one-way shift speed with which the rotary driving force is transmitted from the input shaft I (engine E) to the output shaft O but the rotary driving force is not transmitted from the output shaft O to the input shaft I (engine E).

The second speed is achieved by engagement of the first clutch C1 and engagement of the first brake B1 in a cooperative manner. Specifically, with the first clutch C1 in an engaged state, the rotation and driving force of the input shaft I (engine E) are decelerated based on the gear ratio $\lambda 1$ and transmitted to the second sun gear S3 of the second planetary gear unit P2. With the first brake B1 in an engaged state, the first sun gear S2 of the second planetary gear unit P2 is fixed to the ease CS. Then, the rotation and driving force of the second sun gear S3 are further decelerated based on gear ratios $\lambda 2$ and $\lambda 3$ and transmitted to the output shaft O.

The third speed is achieved by engagement of the first clutch C1 and engagement of the third clutch C3 in a cooperative manner. Specifically, with the first clutch C1 in an engaged state, the rotation and driving force of the input shaft I (engine E) are decelerated based on the gear ratio $\lambda 1$ and transmitted to the second sun gear S3 of the second planetary gear unit P2. With the third clutch C3 in an engaged state, the rotation and driving force of the input shaft I (engine E) are decelerated based on the gear ratio $\lambda 1$ and transmitted to the first sun gear S2 of the second planetary gear unit P2. Then, with the first sun gear S2 and the second sun gear S3 rotating at the same speed, the rotation and driving force of the input shaft I (engine E) decelerated based on the gear ratio $\lambda 1$ are transmitted to the output shaft O.

The fourth speed is achieved by engagement of the first clutch C1 and engagement of the second clutch C2 in a cooperative manner. Specifically, with the first clutch C1 in an engaged state, the rotation and driving force of the input shaft I (engine E) are decelerated based on the gear ratio $\lambda 1$ and transmitted to the second sun gear S3 of the second planetary gear unit P2. With the second clutch C2 in an engaged state, the rotation and driving force of the input shaft I (engine E) are transmitted without change to the carrier CA2 of the second planetary gear unit P2. Then, the rotation and driving force of the input shaft I (engine E) determined based on the rotation speeds of the carrier CA2 and the second sun gear S3 and the gear ratio $\lambda 3$ are transmitted to the output shaft O.

The fifth speed is achieved by engagement of the second clutch C2 and engagement of the third clutch C3 in a cooperative manner. Specifically, with the second clutch C2 in an engaged state, the rotation and driving force of the input shaft I (engine E) are transmitted without change to the carrier CA2 of the second planetary gear unit P2. With the third clutch C3 in an engaged state, the rotation and driving force of the input shaft I (engine E) are decelerated based on the gear ratio $\lambda 1$ and transmitted to the first sun gear S2 of the second planetary gear unit P2. Then, the rotation and driving force of the input shaft I (engine E) determined based on the rotation speeds of the first sun gear S2 and the carrier CA2 and the gear ratio $\lambda 2$ are transmitted to the output shaft O.

The sixth speed is achieved by engagement of the second clutch C2 and engagement of the first brake B1 in a cooperative manner. Specifically, with the second clutch C2 in an engaged state, the rotation and driving force of the input shaft I (engine E) are transmitted without change to the carrier CA2 of the second planetary gear unit P2. With the first brake B1 in an engaged state, the first sun gear S2 of the second planetary gear unit P2 is fixed to the case CS. The rotation and driving force of the carrier CA2 are accelerated based on the gear ratio $\lambda 2$ and transmitted to the output shaft O.

The reverse speed is achieved by engagement of the third clutch C3 and engagement of the second brake B2 in a cooperative manner. Specifically, with the third clutch C3 in an engaged state, the rotation and driving force of the input shaft I (engine E) are decelerated based on the gear ratio $\lambda 1$ and transmitted to the first sun gear S2 of the second planetary gear unit P2. With the second brake B2 in an engaged state, the carrier CA2 of the second planetary gear unit P2 is fixed to the case CS. Then, the rotation and driving force of the first sun gear S2 are decelerated based on the gear ratio $\lambda 2$ and also reversed and transmitted to the output shaft O.

2. Configuration of Hydraulic Control Device

Next, the hydraulic control device PC of the above-described transmission apparatus 1 will be described. The hydraulic control device PC includes the mechanical pump MP as a hydraulic pressure supply source for suctioning hydraulic oil accumulated in an oil pan not shown in the drawings, and supplying the hydraulic oil to various parts of the transmission apparatus 1. In the present example, as illustrated in FIG. 1, the mechanical pump MP is drive-coupled to the pump impeller 14a of the torque converter 14, and driven by the driving force of the engine E. Therefore, the mechanical pump MP does not discharge hydraulic oil while the engine output shaft Eo is stopped (e.g., when the engine E is stopped). In this state, the pressure of the hydraulic oil supplied to the lock-up clutch LC and the respective engagement elements of the speed change mechanism TM decreases, and these engagement elements change to a released state.

The hydraulic control device PC includes a hydraulic control valve not shown in the drawings for adjusting the pressure of the hydraulic oil supplied from the mechanical pump MP to a predetermined pressure. Although a detailed description will not be given here, by adjusting the opening of one or more adjusting valves based on a signal pressure from a linear solenoid valve not shown in the drawings for adjusting hydraulic pressure, the hydraulic control valve adjusts the amount of hydraulic oil to be drained from the adjusting valve, thereby adjusting the pressure of hydraulic oil to a predetermined pressure. The hydraulic oil adjusted to the predetermined pressure is supplied to the plurality of engagement elements C1, C2, C3, B1, B2 of the speed change mechanism TM and the lock-up clutch LC at respective required levels of instruction pressures.

3. Configuration of Engine Control Device

The configuration of the engine control device 21 that controls the engine E will be described. The engine control device 21 is a control device that controls operation of the engine E. Input information from various sensors such as an engine speed sensor Se1 and the accelerator operation amount sensor Se5 is input to the engine control device 21. The engine control device 21 outputs electrical signals for controlling the starter ST, a fuel supply device (not shown) that supplies fuel to the engine E, and the like. The engine control device 21 communicates with the control device 31 regarding sensor information, control parameters, and the like. The engine control device 21 is configured so as to share various data and perform a cooperative control with the control device 31.

The engine control device 21 determines an engine operating point or an engine operating point is instructed by the control device 31 or the like, and the engine control device 21 controls the engine E so as to operate at this engine operating point. Here, the engine operating point is a control instruction value that represents a control target point of the engine E, and determined based on rotation speed and torque. More specifically, the engine operating point is an instruction value that represents a control target point of the engine E determined in consideration of a vehicle required output (determined based on a vehicle required torque and engine speed), and determined based on a rotation speed instruction value and a torque instruction value. The torque instruction value is calculated with input information from the accelerator operation amount sensor Se5 and the like when determined by the engine control device 21. The engine control device 21 controls the engine E to operate at the torque and rotation speed indicated by the engine operating point. The engine operating point also includes control instruction values for starting and stopping the engine E. When there is a control instruction value for starting, the engine control device 21 executes a starting sequence that includes driving the starter ST and supplying starting fuel to the engine E, thus starting the engine E. When there is a control instruction value for stopping, the engine control device 21 executes a stopping sequence that includes cutting off the supply of fuel to the engine E, thus stopping the engine E.

The present embodiment is configured such that, on the condition that the control device 31 determines that a neutral control condition described later is established and transmits a signal for permitting stopping of the engine E to the engine control device 21, the engine control device 21 cuts off the supply of fuel to the engine E to stop the engine E. When the control device 31 determines that the neutral control condition is no longer established and transmits a request signal for restarting the engine E to the engine control device 21, the engine control device 21 executes a starting sequence that includes driving the starter ST and supplying starting fuel to the engine E, thus restarting the engine E.

4. Configuration of Control Device

Figure 5:
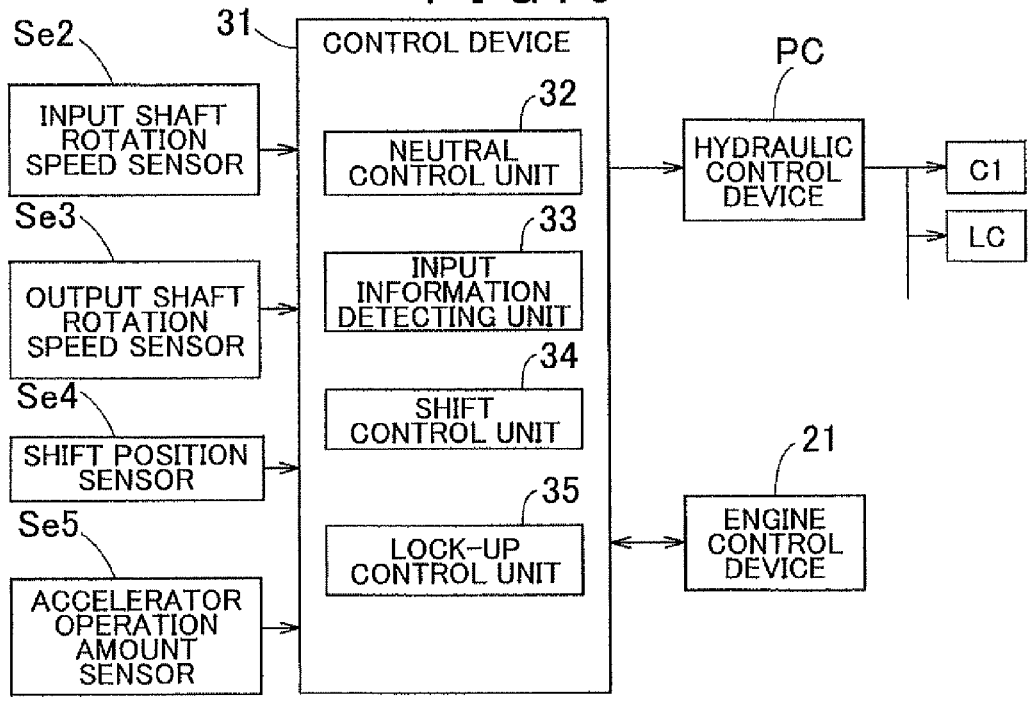
FIG. 5 is a block diagram that shows the configuration of a control device according to the embodiment of the present invention.

Next, the configuration of the control device 31 according to the present embodiment will be described. The control device 31 included in the transmission apparatus 1 controls operation of various parts of the transmission apparatus 1 as illustrated in FIG. 5. The control device 31 includes various functional units: a neutral control unit 32, an input information detecting unit 33, a shift control unit 34, and a lock-up control unit 35. The control device 31 communicates with the engine control device 21, and is configured so as to share various information and perform a cooperative control with the engine control device 21. Hereinafter, respective components of the control device 31 and the cooperative control between the control device 31 and the engine control device 21 will be described in detail.

4-1. Control Device

The control device 31 includes a computation processing device such as CPU as its core member, and is configured with storage devices such as a RAM (Random Access Memory) from which the computation processing device can read data and write data to, a ROM (Read Only Memory) from which the computation processing device can read data, other memory, or the like (none of which are shown). Using software (programs) stored in the ROM or the like, or hardware such as a computing circuit separately provided, or both software and hardware, the respective functional units 32 to 35 of the control device 31 are formed. These functional units 32 to 35 are configured capable of exchanging information with each other.

As illustrated in FIG. 1, this transmission apparatus 1 includes a plurality of sensors provided in the various parts as described above, namely, the input shaft rotation speed sensor Se2, the output shaft rotation speed sensor Se3, the shift position sensor Se4, the accelerator operation amount sensor Se5, and the like. The input information of the various sensors and the like is input to the control device 31. The control device 31 also outputs electrical signals for controlling the hydraulic control device PC and the like. The input information of the engine speed sensor Se1 that is input to the engine control device 21 is also input to the control device 31 via communication with the engine control device 21. Note that the input information of the accelerator operation amount sensor Se5 is input only to the engine control device 21, and this input information may be input to the control device 31 via communication with the engine control device 21.

4-2. Input Information Detecting Unit

The input information detecting unit 33 is a functional unit that detects the input information of the above-described various sensors and the like connected to the control device 31. The respective functional units of the control device 31 use detected values detected by the input information detecting unit 33 to execute various types of operation processing. The input of the respective sensors illustrated in FIG. 5 will be described below. The input shaft rotation speed sensor Se2 is a sensor that detects the rotation speed of the input shaft I. The rotation speed detected by this input shaft rotation speed sensor Se2 is the rotation speed on the output side of the torque converter 14, as well as the rotation speed on the input side of the speed change mechanism TM. The output shaft rotation speed sensor Se3 is a sensor that detects the rotation speed of the output shaft O (output gear O1). The rotation speed detected by this output shaft rotation speed sensor Se3 is the rotation speed on the output side of the speed change mechanism TM. This rotation speed is proportional to the vehicle speed, and thus the input information detecting unit 33 detects the vehicle speed based on this rotation speed. The engine speed sensor Se1 connected to the engine control device 21 is a sensor that detects the rotation speed of the engine output shaft Eo. The rotation speed detected by this engine speed sensor Se1 is the rotation speed of the engine E as well as the rotation speed on the input side of the torque converter 14.

The accelerator operation amount sensor Se5 is a sensor that detects an accelerator operation amount by detecting an operation amount of the accelerator pedal AP. The accelerator pedal AP is operated by the driver. The accelerator operation amount detected by this accelerator operation amount sensor Se5 is one type of "driver request" in the present invention, and used for determining a final target shift speed.

The shift position sensor Se4 is a sensor for detecting a selected position (shift position) of the shift lever SL. As described above, in the present embodiment, the shift lever SL is operated by the driver, whereby the P range, R range, N range, D range, 2 range, and L range can be selected. Therefore, as a detected value of the shift position from the shift position sensor Se4, a value that represents selection of any of the P range, R range, N range, D range, 2 range, and L range is input to the input information detecting unit 33. The input information detecting unit 33 detects which range is selected by the driver based on the input information from the shift position sensor Se4. The shift position (range selection) detected by this shift position sensor Se4 is one type of "driver request" in the present invention, and used for determining the final target shift speed.

4-3. Shift Control Unit

Figure 6:
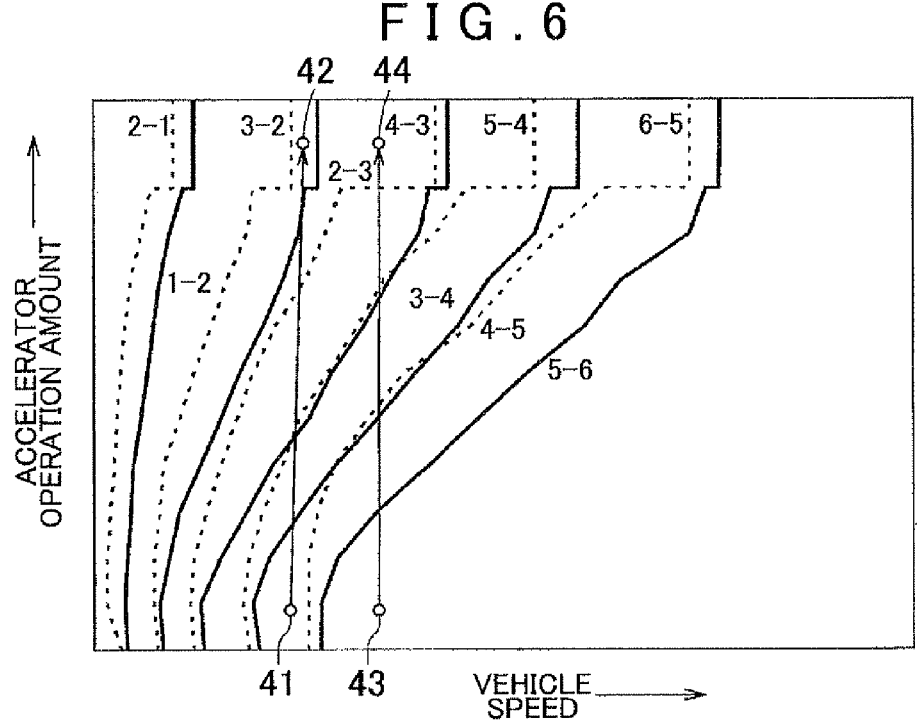
FIG. 6 is a drawing that shows a shift map according to the embodiment of the present invention.

The shift control unit 34 is a functional unit that determines, during a normal control, a target shift speed of the speed change mechanism TM based on the vehicle speed, the accelerator operation amount, and the shift position, and instructs the engagement or release of the engagement elements in the speed change mechanism TM to perform shifting. To determine such a target shift speed, the shift control unit 34 refers to a shift map stored in the ROM or the like, and then determines the target shift speed. FIG. 6 is a drawing that shows an example of a shift map according to the present embodiment. This shift map is a map for the D range. In this map, shift schedules of shift speeds in the speed change mechanism TM are set based on the accelerator operation amount and the vehicle speed. As shown in this drawing, a plurality of upshift lines (solid lines) and a plurality of downshift lines (dashed lines) are set in the shift map, which are represented by straight lines that generally slope upward to the right (the larger the vehicle speed, the larger the accelerator operation amount). Here, the upshift lines define transition schedules from a shift speed with a larger speed ratio to a shift speed with a smaller speed ratio. The downshift lines define transition schedules from a shift speed with a smaller speed ratio to a shift speed with a larger speed ratio. When the shift position is in the D range, the shift control unit 34 determines the target shift speed based on this shift map, and the vehicle speed and the accelerator operation amount. The shift map is set in consideration of the speed ratios of the shift speeds of the speed change mechanism TM, so that the rotation speed of the engine E does not become extremely higher or extremely lower than an operating range.

Specifically, when the vehicle speed and the accelerator operation amount change and cross an upshift line or a downshift line of the shift map in FIG. 6, the shift control unit 34 determines a new target shift speed in the speed change mechanism TM based on the vehicle speed and the accelerator operation amount after the change. The numbers shown in FIG. 6 corresponding to the shift lines represent the respective shift speeds from the first speed to the sixth speed. For example, "5-6" represents an upshift from the fifth speed to the sixth speed, and "6-5" represents a downshift from the sixth speed to the fifth speed. As an example, when the vehicle speed increases or the accelerator operation amount decreases and an upshift line is crossed in the direction of upper left to lower right in FIG. 6, the shift control unit 34 upshifts the target shift speed based on the transition schedule of the crossed upshift line. If the upshift line is "5-6", for example, the target shift speed is changed from the fifth speed to the sixth speed. Note that when the vehicle speed decreases or the accelerator operation amount increases and an upshift line is crossed in the direction of lower right to upper left in FIG. 6, the shift control unit 34 does not change the target shift speed. Meanwhile, when the vehicle speed decreases or the accelerator operation amount increases and a downshift line is crossed in the direction of lower right to upper left in FIG.

6, the shift control unit 34 downshifts the target shift speed based on the transition schedule of the crossed downshift line. If the downshift line is "6-5", for example, the target shift speed is changed from the sixth speed to the fifth speed. Note that when the vehicle speed increases or the accelerator operation amount decreases and a downshift line is crossed in the direction of upper left to lower right in FIG. 6, the shift control unit 34 does not change the target shift speed.

The shift control unit 34 performs a control to switch the shift speed of the speed change mechanism TM by controlling the engagement and release operations of the engagement elements C1, C2, C3, B1, B2 in accordance with the determined target shift speed, based on the operation chart as shown in FIG. 3 stored in the ROM or the like. In other words, as a normal control, the shift control unit 34 performs a control that supplies instruction pressures of hydraulic oil set via the hydraulic control device PC in accordance with an instruction pressure setting sequence to engagement elements that are selected depending on the determined target shift speed, so as to change the engagement elements to an engaged state or a released state and achieve the target shift speed.

When the 2 range or the L range is selected as the shift position, the shift control unit 34 uses the shift map corresponding to each range to determine a selectable shift speed in each range as the target shift speed, based on the shift map, the vehicle speed, and the accelerator operation amount. When the R range is selected, the shift control unit 34 determines the reverse speed as the target shift speed. When the P range or the N range is selected, the shift control unit 34 determines the neutral speed (Ntl) as the target shift speed. When the neutral speed (Ntl) is determined as the target shift speed, the shift control unit 34 performs a control to change all the engagement elements C1, C2, C3, B1, B2 to a released state. However, as will be described later, when a neutral control and a re-engagement control after the neutral control are performed by the neutral control unit 32, the control device 31 prohibits the shift control performed by the shift control unit 34, and performs a shift control using the neutral control unit 32.

4-4. Lock-up Control Unit

The lock-up control unit 35 is a functional unit that determines a target engagement state of the lock-up clutch LC, which is an engagement element, based on the accelerator operation amount of the vehicle, the vehicle speed, and the shift position, and controls the engagement and release of the lock-up clutch LC. To determine such a target engagement state, the lock-up control unit 35 refers to a lock-up map (not shown) stored in the ROM or the like, and then determines the target engagement state. Depending on the determined target engagement state, the lock-up control unit 35 performs a control that supplies an instruction pressure of hydraulic oil set via the hydraulic control device PC in accordance with an instruction pressure setting sequence to the lock-up clutch LC, so as to change the lock-up clutch LC to an engaged state or a released state. In the present embodiment, when the neutral control and the re-engagement control after the neutral control are performed by the neutral control unit 32, the lock-up control unit 35 performs a control to change the lock-up clutch LC to a released state. Meanwhile, in the present embodiment, when an instruction to engage or release the lock-up clutch LC is given from the neutral control unit 32, the lock-up control unit 35 controls the engagement and release of the lock-up clutch LC in accordance with the instruction of the neutral control unit 32.

4-5. Neutral Control Unit

The neutral control unit 32 is a functional unit that performs a neutral control, which will be described later, based on at least the vehicle speed and a driver request, and performs a re-engagement control that forms a shift speed in the speed change mechanism TM by re-engaging a plurality of engagement elements of the speed change mechanism TM after the neutral control. In the present embodiment, the neutral control unit 32 performs a control to stop the engine E during the neutral control, and performs a control to restart the engine E before forming a shift speed with the re-engagement control after the neutral control.

The neutral control is a control that sets the speed change mechanism TM to a neutral state in which none of the shift speeds are formed while the vehicle is traveling. This neutral control is executed if, for example, while traveling, the vehicle changes to a predetermined gradual decelerating operation state in which the requested driving force according to a driver request becomes quite small with respect to a vehicle running resistance that depends on the vehicle speed, and the like. While the neutral control is executed, that is, during the neutral control, drive-coupling between the engine E and the wheel 18 changes to a non-coupled state, and the vehicle changes to a free running state. Engine braking does not take effect during this neutral control, and gradual deceleration of the vehicle due to the vehicle running resistance is achieved. Here, a state in which engine braking takes effect means a state in which the engine E is rotary driven by the rotation of the wheel 18, and a negative driving force is transmitted to the output shaft O due to a rotational resistance of the engine E. In the present embodiment, during the neutral control, the driving force of the engine E is not transmitted to the wheel 18, and thus the control device 31 gives an instruction to stop the engine E to the engine control device 21, thereby reducing the fuel consumption of the engine E. Note that when the vehicle speed becomes zero and the vehicle stops during the neutral control, the neutral control transitions to an idle-stop control, and the vehicle is controlled according to a control sequence of the idle-stop control.

4-5-1. Determination of Neutral Control Condition

The neutral control unit 32 determines whether a neutral control condition is established based on at least the vehicle speed and a driver request. In the present embodiment, the driver request is defined as the selection of a shift speed based on the accelerator operation amount and the shift position.

Here, the neutral control condition is defined in advance based on the vehicle speed, the accelerator operation amount, and the shift position in the present example. For example, the neutral control condition is defined as the vehicle traveling, the accelerator operation amount being within a predetermined range set according to the vehicle speed, and the shift position in the D range. When the neutral control condition is satisfied, the neutral control unit 32 determines that the neutral control condition is established. On the other hand, the neutral control unit 32 determines that the neutral control condition is not established when the neutral control condition is no longer satisfied, such as when the accelerator operation amount leaves the predetermined range due to depression of the accelerator pedal AP by the driver, or when the driver changes the shift position to a range other than the D range, e.g., the 2 range or the like.

4-5-2. Neutral Control

When the neutral control condition is established, the neutral control unit 32 performs a control that changes the speed change mechanism TM to a neutral state in which none of the shift speeds are formed.

In the present embodiment, the neutral control unit 32 performs a control to change the engine E to a stopped state while the neutral control condition is established, and changes all the engagement elements of the speed change mechanism TM to a released state, thereby controlling the speed change mechanism TM to a neutral state. Specifically, the control device 31 transmits a signal for permitting stopping of the engine E to the engine control device 21 when the neutral control condition is established. Thus, the engine control device 21 controls the engine E to a stopped state under a predetermined condition. Note that in the present embodiment, with the engine E controlled to a stopped state, the mechanical pump MP stops and the hydraulic pressure of the hydraulic pressure source supplied to the hydraulic control device PC decreases. This also stops the supply of hydraulic pressure from the hydraulic control device PC to the engagement elements of the speed change mechanism TM, and the engagement elements change to a released state.

4-5-3. Re-engagement Control

When transitioning to an actual traveling state by forming a shift speed from a free running state in which the vehicle is in a traveling state and the speed change mechanism TM is in a neutral state with none of the shift speeds formed, the neutral control unit 32 performs a re-engagement control. In this re-engagement control, the neutral control unit 32 determines from the plurality of shift speeds one final target shift speed according to at least the vehicle speed and a driver request, determines an intermediate target shift speed with a speed ratio smaller than that of the final target shift speed, and forms the final target shift speed after formation of the intermediate target shift speed. The re-engagement control performed by the neutral control unit 32 will be described in detail below.

4-5-3-1, Determination of Start of Re-engagement Control

During the neutral control with the neutral control condition established, if the neutral control condition is no longer established, the neutral control unit 32 determines that a starting condition of the re-engagement control is established and starts a re-engagement control sequence. In the present embodiment, as described above, the neutral control unit 32 determines whether the neutral control condition is established based on the vehicle speed and driver requests that include the accelerator operation amount and the shift position. The following description of the embodiment gives an example in which a determination is made to transition to an actual traveling state if an acceleration request from the driver based on the accelerator operation amount is received while the vehicle is in a free running state. More specifically, an example will be described in which, as illustrated in FIG. 7 (at a time t11) and FIG. 8 (at a time t31), the driver depressing the accelerator pedal AP during the neutral control causes the accelerator operation amount to leave the predetermined range of the neutral control condition, such that the neutral control condition is no longer established.

4-5-3-2. Determination of Final Target Shift Speed

While performing the re-engagement control, the neutral control unit 32 determines the final target shift speed based on at least the vehicle speed and a driver request. In the present embodiment, similar to the shift control unit 34, the neutral control unit 32 determines the final target shift speed based on the vehicle speed, and the accelerator operation amount and the shift position that are driver requests. Specifically, when the D range is selected as the shift position, similar to the shift control unit 34, the neutral control unit 32 determines the final target shift speed by referring to the shift map of FIG. 6 based on the vehicle speed and the accelerator operation amount. That is, the neutral control unit 32 determines the target shift speed, which is determined by the shift control unit 34 by referring to the shift map of FIG. 6 in an actual traveling state, as the final target shift speed while the re-engagement control is performed. Note that to determine the intermediate target shift speed, which will be described later, the neutral control unit 32 also determines the final target shift speed during the neutral control in the same manner as during the re-engagement control.

Figure 7:
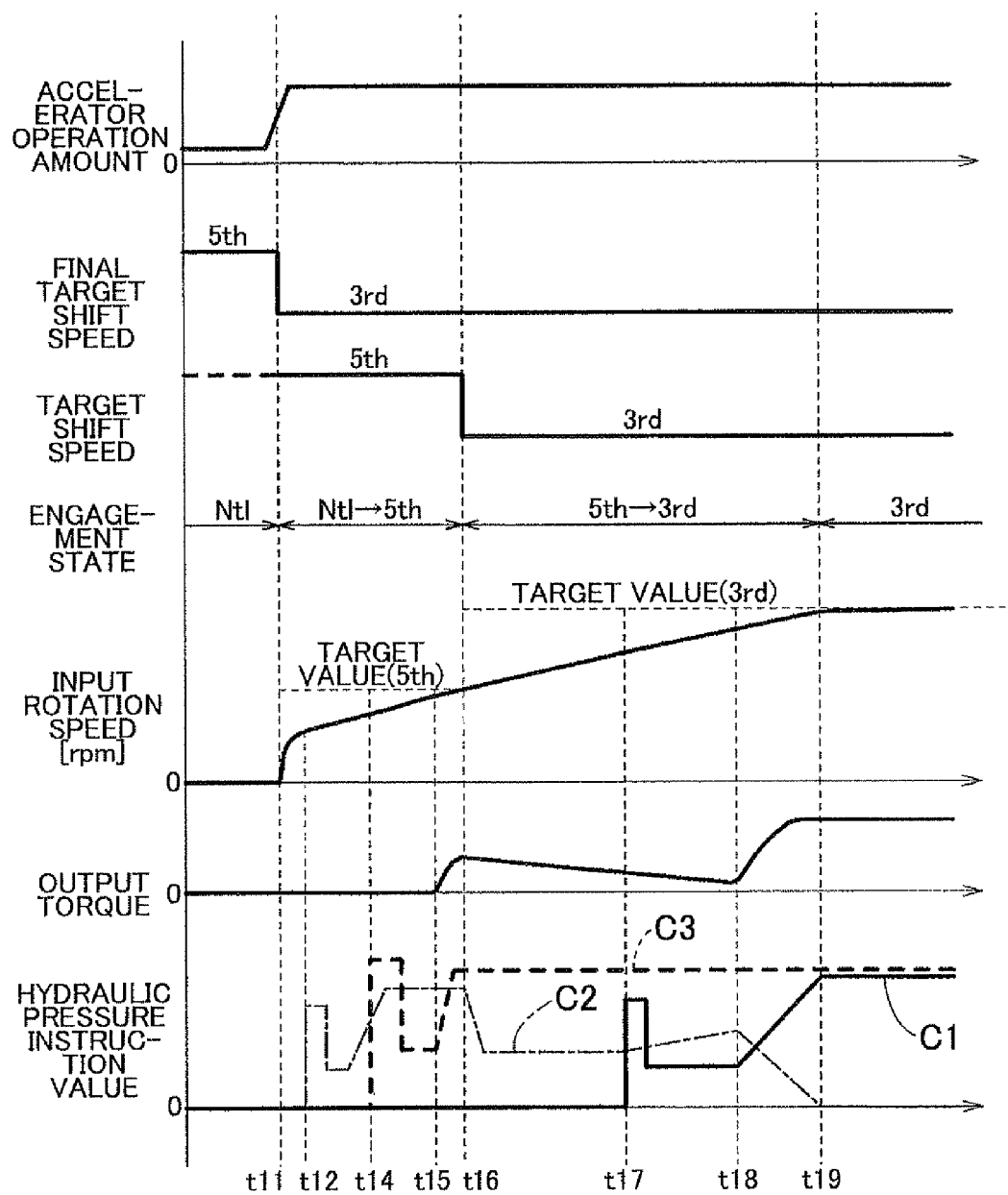
FIG. 7 is a timing chart that shows processing of the control device according to the embodiment of the present invention.

In the example illustrated in FIG. 7, before the accelerator operation amount increases around the time t11, the final target shift speed was determined to be the fifth speed in the shift map of FIG. 6 (a state 41). However, with the accelerator operation amount increased around the time t11, the two downshift lines of "5-4" and "4-3" are crossed, and the final target shift speed is thus determined to be the third speed (a state 42).

Figure 8:
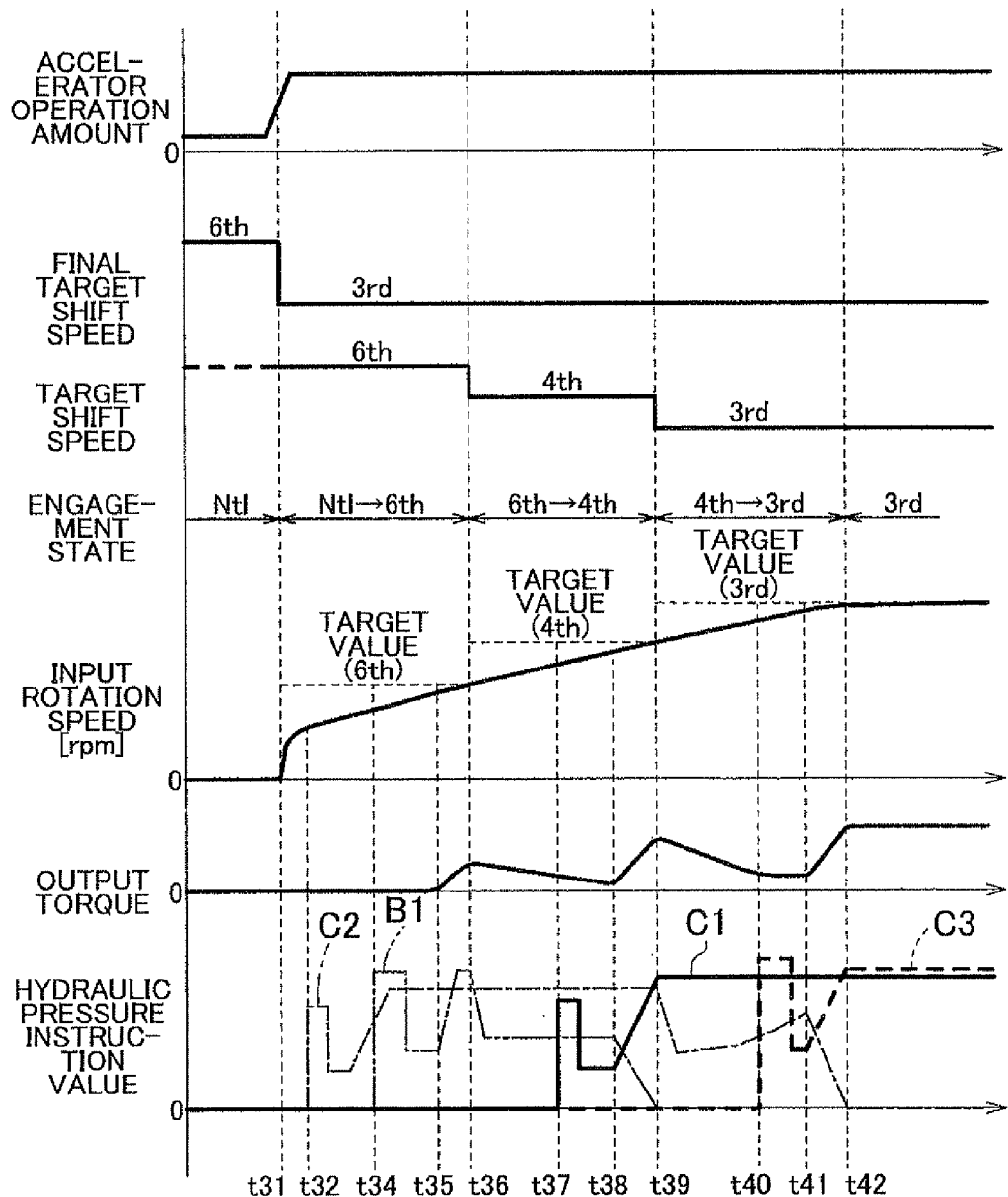
FIG. 8 is a timing chart that shows processing of the control device according to the embodiment of the present invention.

In the example illustrated in FIG. 8, before the accelerator operation amount increases around the time t31, the final target shift speed was determined to be the sixth speed in the shift map of FIG. 6 (a state 43). However, with the accelerator operation amount increased around the time t31, the three downshift lines of "6-5", "5-4", and "4-3" are crossed, and the final target shift speed is thus determined to be the third speed (a state 44).

4-5-3-3. Determination of Intermediate Target Shift Speed

After the starting condition of the re-engagement control is established, the neutral control unit 32 determines the intermediate target shift speed, which is a shift speed with a speed ratio smaller than that of the final target shift speed. In the present embodiment, the neutral control unit 32 determines the final target shift speed immediately before the starting condition of the re-engagement control is established as one intermediate target shift speed. In the present embodiment, this intermediate target shift speed is called a first intermediate target shift speed. Note that if the intermediate target shift speed is the same as the final target shift speed after the starting condition of the re-engagement control is established, the neutral control unit 32 does not determine the intermediate target shift speed, and instead determines the final target shift speed as the target shift speed that will be described later.

When there are shift speeds with a speed ratio larger than that of the determined first intermediate target shift speed and smaller than that of the final target shift speed (hereinafter referred to as intermediate shift speeds), the neutral control unit 32 determines an intermediate target shift speed other than the first intermediate target shift speed from the intermediate shift speeds. In the present embodiment, even if intermediate shift speeds exist, the neutral control unit 32 does not necessarily determine each of the intermediate shift speeds as an intermediate target shift speed, and the intermediate target shift speed may not be determined as one among the intermediate shift speeds. The determination of the intermediate target shift speed from these intermediate shift speeds is executed according to a preset pattern.

This pattern is set in consideration of drivability. More specifically, the pattern is set such that, when intermediate shift speeds exist and the difference in speed ratio between the first intermediate target shift speed and the final target shift speed is equal to or greater than a predetermined value, at least one intermediate target shift speed is determined from the intermediate shift speeds so that the difference in speed ratio between two target shift speeds with close speed ratios becomes equal to or less than the predetermined value.

The pattern is also set that at least one intermediate target shift speed is set from the intermediate shift speeds so that, during the switching of the target shift speeds from the first intermediate target shift speed to the final target shift speed, simultaneous changeover of two engagement elements does not occur.

In the present embodiment, the neutral control unit 32 has a pattern table that is stored in the ROM or the like and presets intermediate target shift speeds other than the first intermediate target shift speed depending on the first intermediate target shift speed and the final target shift speed. The neutral control unit 32 determines an intermediate target shift speed other than the first intermediate target shift speed from the pattern table based on the determined first intermediate target shift speed and final target shift speed. Note that this pattern for determining the intermediate target shift speed changes depending on the type of speed change mechanism TM, vehicle characteristics, and the like.

In the example illustrated in FIG. 7, the fifth speed is determined as the first intermediate target shift speed, and the third speed is determined as the final target shift speed. In this case, the fourth speed is an intermediate shift speed. However, no intermediate target shift speed other than the first intermediate target shift speed is stored in the pattern table, and thus the neutral control unit 32 does not determine an intermediate target shift speed other than the first intermediate target shift speed. This is because the difference in speed ratio between the fifth speed and the third speed is relatively small, and the transition in output torque that can be transmitted from the first intermediate target shift speed to the final target shift speed is good even when the fourth speed is not formed. This is also because forming the fourth speed creates a long period between the start of the re-engagement control and formation of the final target shift speed, which is regarded as a deterioration in drivability. Moreover, switching from the fifth speed to the third speed is performed by releasing the second clutch C2 and engaging the first clutch C1 while maintaining the third clutch C3 in an engaged state, as shown in the operation chart of FIG. 3. That is, simultaneous changeover of two engagement elements is not necessary. Therefore, from this standpoint as well, formation of the fourth speed is regarded as not necessary.

In the example illustrated in FIG. 8, the sixth speed is determined as the first intermediate target shift speed, and the third speed is determined as the final target shift speed. In this case, the fifth speed and the fourth speed are intermediate shift speeds. The fourth speed is stored as an intermediate target shift speed other than the first intermediate target shift speed in the pattern table, and the neutral control unit 32 determines the fourth speed as an intermediate target shift speed other than the first intermediate target shift speed. This is because the difference in speed ratio between the sixth speed and the third speed is relatively large, and formation of the fourth speed creates a better transition in output torque that can be transmitted from the first intermediate target shift speed to the final target shift speed. This is also because even when the fourth speed is formed and creates a long period between the start of the re-engagement control and formation of the final target shift speed, it is regarded as an improvement in drivability. Moreover, to switch from the sixth speed to the third speed, the second clutch C2 and the first brake B1 of the sixth speed must be released and the first clutch C1 and the third clutch C3 of the third speed must be engaged as shown in the operation chart of FIG. 3, and thus simultaneous changeover of two engagement elements is necessary. On the other hand, by forming the fourth speed between the sixth speed and the third speed, switching from the sixth speed to the fourth speed is performed by releasing the first brake B1 and engaging the first clutch C1 while the second clutch C2 is maintained in an engaged state as shown in the operation chart of FIG. 3. Switching from the fourth speed to the third speed is performed by releasing the second clutch C2 and engaging the third clutch C3 while the first clutch C1 is maintained in an engaged state. That is, by forming the fourth speed as an intermediate target shift speed, simultaneous changeover of two engagement elements is not necessary. Therefore, from this standpoint as well, formation of the fourth speed as an intermediate target shift speed is regarded as necessary.

4-5-3-4. Restarting of Engine

In the present embodiment, the neutral control unit 32 performs a control to start the engine E before starting formation of the target shift speed. Specifically, the neutral control unit 32 transmits a request signal for starting the engine E to the engine control device 21 when the starting condition of the re-engagement control is established (the time t11 in FIG. 7 and the time t31 in FIG. 8). Accordingly, as described above, the engine control device 21 executes a starting sequence that includes driving the starter ST and supplying fuel to start the engine E, thus starting the engine E. In the present example, the engine control device 21 is configured to transmit information that starting of the engine E is complete to the control device 31 when starting of the engine E is determined complete, such as when the rotation speed of the engine E reaches a predetermined rotation speed (a time t12 in FIG. 7 and a time t32 in FIG. 8).

4-5-3-5. Start of Re-engagement Control

In the present embodiment, after the starting condition of the re-engagement control is established and the engine E is started, the neutral control unit 32 starts the re-engagement control to supply instruction pressures of hydraulic oil to respective engagement elements of the speed change mechanism TM (the time t12 in FIG. 7 and the time t32 in FIG. 8). Once the engine E is started, the mechanical pump MP drive-coupled to the engine output shaft Eo is driven, and the hydraulic pressure of the hydraulic pressure supply source that is supplied to the hydraulic control device PC increases again. It is thus possible to execute the re-engagement control. Note that in the present embodiment, the control device 31 starts the re-engagement control upon receiving the information that starting of the engine E is complete from the engine control device 21.

After the re-engagement control is started, the neutral control unit 32 performs a control to form the final target shift speed after the intermediate target shift speed is formed. In the present embodiment, when the neutral control unit 32 determines two or more intermediate target shift speeds, that is, determines one or more intermediate target shift speeds from the intermediate shift speeds in addition to the first intermediate target shift speed, the neutral control unit 32 performs a control to sequentially form the shift speeds, starting with the shift speed with the smaller speed ratio among the two or more intermediate target shift speeds and forming the final target shift speed last.

4-5-3-6. Formation of First Intermediate Target Shift Speed

After the re-engagement control is started, first, the neutral control unit 32 performs a control to form the first intermediate target shift speed that is the intermediate target shift speed with the smallest speed ratio.

In the present embodiment, the neutral control unit 32 performs a control to set the first intermediate target shift speed as the target shift speed and form this target shift speed.

The neutral control unit 32 is configured to calculate a target input rotation speed as the target value of the input shaft I (engine E) corresponding to the set target shift speed. This target input rotation speed is calculated based on the detected rotation speed of the output shaft O (output gear O1) and the speed ratio (reduction ratio) of the target shift speed. More specifically, the target input rotation speed is a rotation speed obtained by multiplying the rotation speed of the output shaft O (output gear O1) by the speed ratio of the target shift speed. In the present embodiment, the input rotation speed is the rotation speed of the input shaft I detected by the input shaft rotation speed sensor Set, and the rotation speed of the output shaft O (output gear O1) is the rotation speed of the output shaft O (output gear O1) detected by the output shaft rotation speed sensor Se3.

The neutral control unit 32 performs a control so as to first engage another engagement element (referred to as a preceding engagement element) other than an engagement element (referred to as a final engagement element) among the engagement elements that must be engaged to form the first intermediate target shift speed, and engage the final engagement element after the input rotation speed reaches the vicinity of the target input rotation speed.

In the present embodiment, to achieve such an engagement sequence, the neutral control unit 32 starts a supply of an instruction pressure of hydraulic oil via the hydraulic control device PC to the preceding engagement element immediately after the re-engagement control is started, and starts a supply of an instruction pressure via the hydraulic control device PC to the final engagement element after the input rotation speed reaches the vicinity of the target input rotation speed. Note that if there is only one engagement element that must be engaged to form the first intermediate target shift speed, the supply of the instruction pressure to this engagement element is not started immediately after the re-engagement control is started; the supply of the instruction pressure is started after the input rotation speed reaches the vicinity of the target input rotation speed.

In the speed change mechanism TM of the present embodiment, as shown in the operation chart of FIG. 3, the shift speeds other than the first speed are formed by engaging two engagement elements. Therefore, when one of the shift speeds other than the first speed is set as the first intermediate target shift speed, the neutral control unit 32 performs a control to engage one of the two engagement elements (the preceding engagement element) first, and subsequently engage the other of the engagement elements (the final engagement element). Note that this preceding engagement element is determined in advance. In the example illustrated in FIG. 7, the target shift speed is set as the fifth speed, the preceding engagement element is set as the second clutch C2, and the final engagement element is set as the third clutch C3. In the example illustrated in FIG. 8, the target shift speed is set as the sixth speed, the preceding engagement element is set as the second clutch C2, and the final engagement element is set as the first brake B1.

Immediately after the re-engagement control is started, the neutral control unit 32 supplies an instruction pressure of hydraulic oil set via the hydraulic control device PC in accordance with a preset instruction pressure setting sequence to the preceding engagement element, so as to change this engagement element to an engaged state. In the present embodiment, the neutral control unit 32 performs a control to increase the instruction pressure in a stepped manner to a predetermined instruction pressure at which the preceding engagement element achieves a completely engaged state. In the examples illustrated in FIGS. 7 and 8, a control is performed to momentarily set a high instruction pressure immediately after the supply of the instruction pressure to the preceding engagement element is started, so as to hasten the rise of the actual pressure.

When the input rotation speed increases and the rotation speed difference between the input rotation speed and the target input rotation speed of the target shift speed becomes equal to or less than a first predetermined value (a time t14 in FIG. 7 and a time t34 in FIG. 8), the neutral control unit 32 starts a control to supply an instruction pressure of hydraulic oil that is set to a preliminary engagement pressure via the hydraulic control device PC to the final engagement element. In the present embodiment, the preliminary engagement pressure is set to a pressure smaller by a predetermined pressure than the pressure at which engagement of each engagement element starts, namely, a stroke end pressure that is a pressure at which a transfer torque capacity starts to occur. The neutral control unit 32 gives this preliminary engagement pressure as an instruction pressure to the hydraulic control device PC, and supplies hydraulic oil at the instruction pressure to the final engagement element. In the examples illustrated in FIGS. 7 and 8, a control is performed to momentarily set the instruction pressure higher than the preliminary engagement pressure immediately after the supply of the instruction pressure to the final engagement element is started, so as to hasten the rise of the actual pressure.

When the input rotation speed further increases and the rotation speed difference between the input rotation speed and the target input rotation speed of the target shift speed becomes equal to or less than a second predetermined value that is smaller than the first predetermined value (a time t15 in FIG. 7 and a time t35 in FIG. 8), the neutral control unit 32 increases the instruction pressure in a stepped manner from the preliminary engagement pressure to a predetermined instruction pressure at which a completely engaged state is reached, whereby the final engagement element achieves a completely engaged state. This second predetermined value is set such that the point at which each engagement element achieves a completely engaged state matches the point at which the input rotation speed matches the target input rotation speed. The final engagement element achieving a completely engaged state forms the first intermediate target shift speed. Note that the neutral control unit 32 may control the final engagement element to a partially engaged state. Alternatively, the neutral control unit 32 may switch the target shift speed before the final engagement element achieves a completely engaged state, and start formation of the post-switch target shift speed. Even in such a partially engaged state, a transfer torque capacity is generated in the engagement element, and the torque of the engine E can thus be transmitted from the input shaft I to the output shaft O.

When the input rotation speed reaches the vicinity of the target input rotation speed of the target shift speed and a transfer torque capacity starts to occur in the final engagement element, the shift speed that is the target shift speed can transmit a positive output torque that is an output torque capable of accelerating the vehicle from the input shaft I to the output shaft O. Therefore, in the present embodiment, at and after the point at which the input rotation speed reaches the vicinity of the target input rotation speed of the first intermediate target shift speed and the instruction pressure to the final engagement element starts to increase (the time t15 in FIG. 7 and the time t35 in FIG. 8), the positive output torque that is an output torque capable of accelerating the vehicle can be transmitted from the input shaft I to the output shaft O.

4-5-3-7. Formation of Intermediate Target Shift Speed and Final Target Shift Speed After the first intermediate target shift speed is formed, if no intermediate target shift speed other than the first intermediate target shift speed is determined, the neutral control unit 32 performs a control to form the final target shift speed. When two or more intermediate target shift speeds are determined, the neutral control unit performs a control to sequentially form the shift speeds, starting with the shift speed with the smaller speed ratio among the two or more intermediate target shift speeds and forming the final target shift speed last.

In the present embodiment, the neutral control unit 32 switches from an intermediate target shift speed to the final target shift speed and switches between intermediate target shift speeds by controlling one engagement element that forms the pre-switch target shift speed to a partially engaged state. By thus changing an engagement element of the shift speed that is the pre-switch target shift speed to a partially engaged state while switching shift speeds, the shift speed that is the pre-switch target shift speed is maintained in a state capable of transmitting the positive output torque from the input shaft I to the output shaft O. Accordingly, it is also possible to suitably respond to an acceleration request from the driver while switching shift speeds.

In the present embodiment, when it is determined that a target shift speed set as an intermediate target shift speed is formed, the neutral control unit 32 switches the target shift speed to the intermediate target shift speed with the next smaller speed ratio or the final target shift speed. In the present embodiment, when the input rotation speed reaches the target input rotation speed of the pre-switch target shift speed, the neutral control unit 32 determines that this target shift speed is formed (a time t16 in FIG. 7 and a time t36 in FIG. 8). This post-switch target shift speed is the third speed, i.e., the final target shift speed, in the example of FIG. 7, and the fourth speed, i.e., the intermediate target shift speed, in the example of FIG. 8.

After switching the target shift speed, the neutral control unit 32 controls an engagement element that forms the pre-switch target shift speed to a partially engaged state. This engagement element set to a partially engaged state is an engagement element that is engaged for the pre-switch target shift speed, and set as a release-side changeover engagement element that is an engagement element to be released for the post-switch target shift speed. In the present embodiment, the release-side changeover engagement element is one engagement element as described above. Accordingly, having one engagement element to be set to a partially engaged state makes it possible to improve the control precision of a transfer torque capacity, which is the torque that can be transmitted by a shift speed. Therefore, it is possible to improve the period of switching each shift speed during the re-engagement control, as well as the control precision of output torque, and drivability can be improved.

In the present embodiment, when the target shift speed is switched (the time t16 in FIG. 7 and the time t36 in FIG. 8), the neutral control unit 32 performs a control to decrease in a stepped manner the instruction pressure of hydraulic oil supplied to the release-side changeover engagement element, which is an engagement element that forms the pre-switch target shift speed, from a complete engagement pressure to a partial engagement pressure via the hydraulic control device PC, thus transitioning the release-side changeover engagement element to a partially engaged state. This partial engagement pressure is set such that a predetermined transfer torque capacity occurs in the engagement element. Meanwhile, a non-changeover engagement element that is an engagement element to be engaged for the pre-switch target shift speed and the post-switch target shift speed is maintained to a completely engaged state regardless of the target shift speed switching. Therefore, the pre-switch target shift speed is in a state capable of transmitting torque at a predetermined transfer torque capacity, and the input rotation speed is in a state capable of varying from the target input rotation speed of the target shift speed. The release-side changeover engagement element is the second clutch C2 in the example of FIG. 7, and the first brake B1 in the example of FIG. 8. The non-changeover engagement element is the third clutch C3 in the example of FIG. 7, and the second clutch C2 in the example of FIG. 8.

When the input rotation speed increases and the rotation speed difference between the input rotation speed and the target input rotation speed of the post-switch target shift speed becomes equal to or less than a first predetermined value (a time t17 in FIG. 7 and a time t37 in FIG. 8), the neutral control unit 32 starts a control to supply an instruction pressure of hydraulic oil set to the preliminary engagement pressure via the hydraulic control device PC to an engagement-side changeover engagement element. Here, the engagement-side changeover engagement element is an engagement element released for the pre-switch target shift speed, and an engagement element to be engaged for the post-switch target shift speed. In the present embodiment, the neutral control unit 32 gives this preliminary engagement pressure as an instruction pressure to the hydraulic control device PC, thus supplying the instruction pressure of hydraulic oil to the engagement-side changeover engagement element. In the present example, as illustrated in the examples of FIGS. 7 and 8, a control is performed to momentarily set an instruction pressure higher than the preliminary engagement pressure immediately after the supply of the instruction pressure to the engagement-side changeover engagement element is started, so as to hasten the rise of the actual pressure. The engagement-side changeover engagement element is the first clutch C1 in the example of FIG. 7, and the first clutch C1 in the example of FIG. 8.

When the input rotation speed further increases and the rotation speed difference between the input rotation speed and the target input rotation speed of the post-switch target shift speed becomes equal to or less than a second predetermined value that is smaller than the first predetermined value (a time t18 in FIG. 7 and a time t38 in FIG. 8), the neutral control unit 32 increases in a stepped manner the instruction pressure of hydraulic oil supplied to the engagement-side changeover engagement element from the preliminary engagement pressure to a predetermined instruction pressure at which this engagement element achieves a completely engaged state, thus transitioning the engagement-side changeover engagement element to a completely engaged state. In addition, at such time, the instruction pressure of hydraulic oil supplied to the release-side changeover engagement element is decreased in a stepped manner from the partial engagement pressure to a predetermined instruction pressure (zero in the present example) at which this engagement element achieves a released state, thus transitioning the release-side changeover engagement element to a released state. When the instruction pressure of the engagement-side changeover engagement element increases from the preliminary engagement pressure and a transfer torque capacity starts to occur, the shift speed that is the target shift speed changes to a state capable of transmitting torque from the input shaft I to the output shaft O, and the output torque starts to increase.

When the changeover of the engagement elements is complete (a time t19 in FIG. 7 and a time t39 in FIG. 8), the shift speed is completely switched from the pre-switch target shift speed to the post-switch target shift speed.

If the post-switch target shift speed is the final target shift speed and it is determined that the target shift speed is formed, the neutral control unit 32 ends the re-engagement control and ends the neutral control. Then, the normal shift control performed by the shift control unit 34 is started again (a time t19 in FIG. 7 and a time t42 in FIG. 8). Here, since the final target shift speed is determined by referring to the shift map in the same manner as determined by the shift control unit 34, the target shift speed remains the same before and after the transition to the shift control unit 34. Therefore, after the transition to the shift control unit 34, the shift speed formed by the re-engagement control is maintained, and the positive output torque that is an output torque capable of accelerating the vehicle can be continuously transmitted from the input shaft I to the output shaft O.

However, when it is determined that the post-switch target shift speed is an intermediate target shift speed and that the target shift speed is formed, the neutral control unit 32 switches the target shift speed to the intermediate target shift speed with the next smaller speed ratio or the final target shift speed. The neutral control unit 32 then performs a control to switch the shift speed similar to the above-described processing. Specifically, after switching the target shift speed, the neutral control unit 32 controls an engagement element that forms the pre-switch target shift speed to a partially engaged state. When the input rotation speed reaches the target input rotation speed of the post-switch target shift speed, the neutral control unit 32 controls the shift speed to completely switch from the pre-switch target shift speed to the post-switch target shift speed. The neutral control unit 32 repeatedly executes this shift speed switching control until the target shift speed is switched to the final target shift speed, and the final target shift speed is formed.

In the example illustrated in FIG. 8, when it is determined that the fourth speed that is an intermediate target shift speed set as the target shift speed is formed (the time t39), the neutral control unit 32 switches the target shift speed to the third speed that is the final target shift speed. The neutral control unit 32 then performs a control to change the second clutch C2 that is the release-side changeover engagement element of the pre-switch target shift speed to a partially engaged state. Thereafter, at a point when the input rotation speed approaches the target input rotation speed of the post-switch target shift speed (a time t40), the neutral control unit 32 starts a control to supply an instruction pressure of hydraulic oil set to the preliminary engagement pressure to the third clutch C3 that is the engagement-side changeover engagement element. At a point when the input rotation speed further approaches the target input rotation speed (a time t41), the neutral control unit 32 starts a control to change the third clutch C3 that is the engagement-side changeover engagement element to a completely engaged state, and starts a control to change the second clutch C2 that is the release-side changeover engagement element to a released state. When it is determined that the third speed that is the final target shift speed set as the target shift speed is formed (a time t42), the neutral control unit 32 ends the neutral control as described above.

4-5-3-8. Operation and Effect of Re-engagement Control

Figure 9:
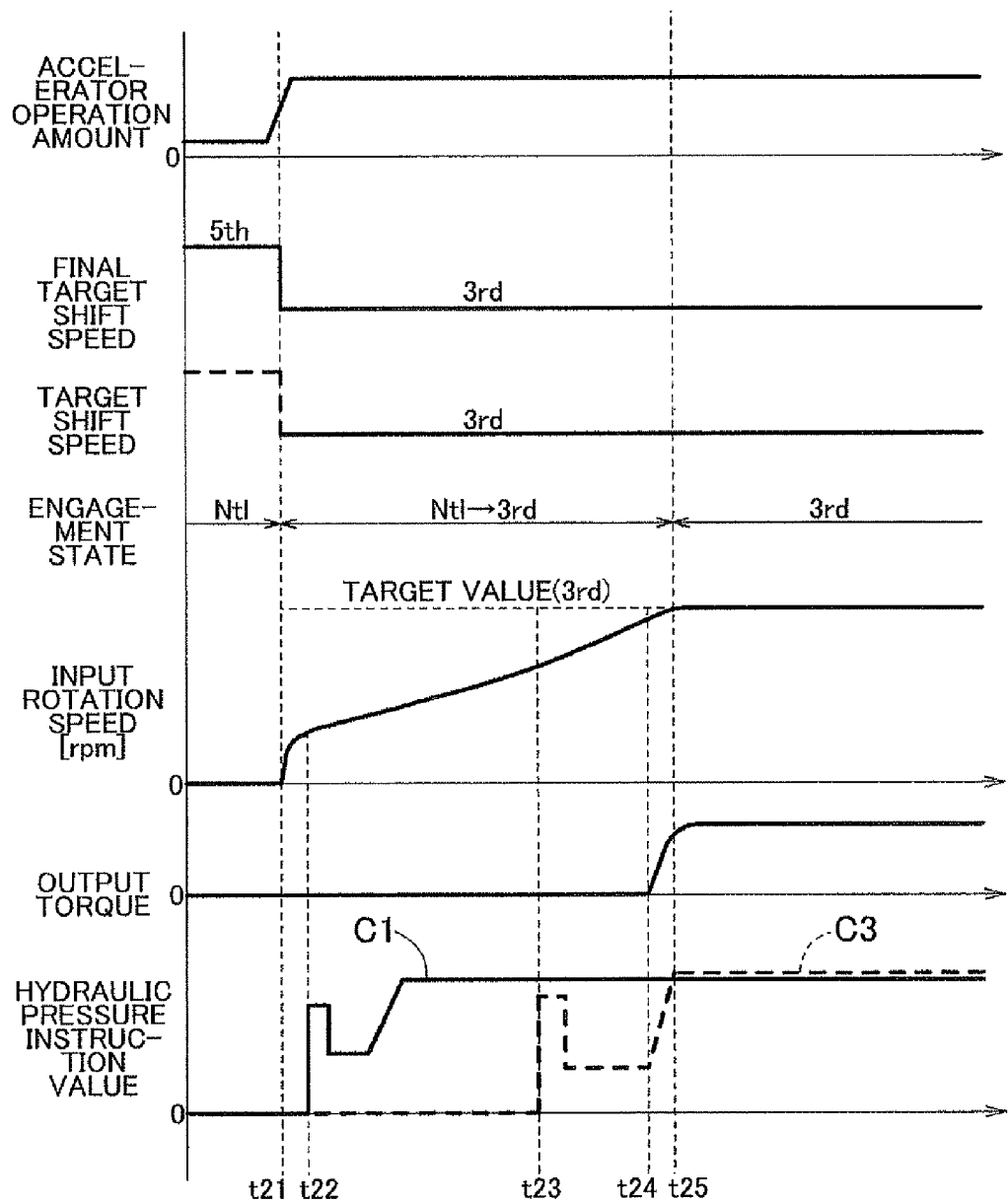
FIG. 9 is a timing chart that shows processing different from the processing of the embodiment of the present invention.

Next, the operation and effect of the re-engagement control according to the present embodiment will be described based on FIGS. 7 to 9. FIG. 9 shows an example in which, unlike the present embodiment, when a transition is made from a free running state that is a neutral state to an actual traveling state by forming a shift speed, the final target shift speed is directly formed without forming an intermediate target shift speed. Changes in the vehicle speed and the accelerator operation amount in the example illustrated in FIG. 9 are similar to those in the example illustrated in FIG. 7 according to the present embodiment, and represent a change from the state 41 to the state 42 in the shift map of FIG. 6.

The final target shift speed in the example illustrated in FIG. 9 is determined by referring to the shift map of FIG. 6 in the same manner as determined in the example illustrated in FIG. 7, and set as the third speed similar to the final target shift speed in the example illustrated in FIG. 7. In the example illustrated in FIG. 9, when the speed change mechanism TM transitions from a neutral state to a state in which a shift speed is formed, the final target shift speed is set as the target shift speed to be formed first. Thus, in the example illustrated in FIG. 9, the target input rotation speed of the target shift speed to be formed first increases, and a point at which the input rotation speed reaches this target input rotation speed (a time t25) is considerably later than a point at which formation of the shift speed in the speed change mechanism TM is started (a time t21). However, in the example illustrated in FIG. 7 according to the present embodiment, the fifth speed that is the intermediate target shift speed smaller in speed ratio than the final target shift speed is set as the target shift speed to be formed first. Accordingly, the target input rotation speed of the target shift speed to be formed first in the example illustrated in FIG. 7 is low, and a point at which the input rotation speed reaches the target input rotation speed (the time t16) is much earlier compared to the case of FIG. 9 (the time t25). In the examples illustrated in FIGS. 7 and 9, when the input rotation speed reaches the vicinity of the target input rotation speed of the target shift speed, the transfer torque capacity of the final engagement element of the target shift speed is increased, and the shift speed that is the target shift speed is transitioned to a state capable of transmitting torque, thereby forming the shift speed that is the target shift speed.

When the input rotation speed reaches the vicinity of the target input rotation speed of the target shift speed and a transfer torque capacity starts to occur in the final engagement element, the speed change mechanism TM can transmit the positive output torque that is an output torque capable of accelerating the vehicle from the input shaft I to the output shaft O. Around and after a time t24 in the example illustrated in FIG. 9 and around and after the time t15 in the example illustrated in FIG. 7, the speed change mechanism TM can transmit the positive output torque from the input shaft I to the output shaft O. Therefore, in the example illustrated in FIG. 7 in which the intermediate target shift speed is formed, the point at which the positive output torque can be transmitted is much earlier compared to the example illustrated in FIG. 9 in which the intermediate target shift speed is not formed. Therefore, when transitioning from a free running state to an actual traveling state, the transmission apparatus 1 according to the present embodiment enables a considerable reduction in the period until the positive output torque can be transmitted to the output shaft O, thus improving a response speed to an acceleration request from the driver.

In the re-engagement control according to the present embodiment, switching from the intermediate target shift speed to the final target shift speed and switching between intermediate target shift speeds is performed with one engagement element that forms the pre-switch target shift speed controlled to a partially engaged state as described above. Therefore, as illustrated in the examples of FIGS. 7 and 8, during shift speed switching (the time t16 to the time t19 of FIG. 7; and the time t36 to the time t39, and the time t39 to the time t42 of FIG. 8), the input rotation speed can be increased to the target input rotation speed of the post-switch target shift speed. Thus, formation of the post-switch target shift speed occurs earlier. The pre-switch target shift speed is formed with an engagement element in a partially engaged state, and the input rotation speed is higher than the target input rotation speed of the pre-switch target shift speed. Thus, even during shift speed switching, the pre-switch target shift speed can transmit the positive output torque from the input shaft I to the output shaft O.

As described in the example of the re-engagement control illustrated in FIG. 8, a plurality of shift speeds is determined as intermediate target shift speeds according to a preset pattern. Shift speeds are sequentially formed, starting with the shift speed with the smaller speed ratio among the plurality of intermediate target shift speeds, and the final target shift speed is formed last. Accordingly, more shift speeds are formed in ascending order of speed ratio from the intermediate target shift speed with the smallest speed ratio to the final target shift speed, so the transition to the speed ratios of shift speeds to be formed improves. Thus, the transition in output torque that can be transmitted by the shift speeds formed improves. Therefore, the output torque can be smoothly increased in a stepped manner, which improves drivability. The target input rotation speeds of the shift speeds formed have a small increase width, and a short shift speed switching period is achieved.

Other Embodiments (1) In the above-described embodiment, as an example, the neutral control unit 32 determines the final target shift speed immediately before the starting condition of the re-engagement control is established as the first intermediate target shift speed. However, embodiments of the present invention are not limited to this example. Specifically, in another preferred embodiment of the present invention, the neutral control unit 32 is configured to always determine the shift speed with the smallest speed ratio among the plurality of shift speeds provided in the speed change mechanism TM as the first intermediate target shift speed.

(2) In the above-described embodiment, as an example, the neutral control unit 32 determines a timing to engage or release an engagement element that forms each target shift speed based on the rotation speed difference between the input rotation speed and the target input rotation speed. However, embodiments of the present invention are not limited to this example. Specifically, in another preferred embodiment of the present invention, the neutral control unit 32 is configured to determine the timing to engage or release an engagement element that forms each target shift speed based on an elapsed time from a point at which a determination is made to transition to an actual traveling state. Accordingly, even if the input rotation speed does not reach the target input rotation speed for any reason, each target shift speed can be formed and the re-engagement control can be completed to enable a transition to the normal shift control.

(3) In the above-described embodiment, as an example, when the vehicle is in a free running state and an acceleration request from the driver is received, the neutral control unit 32 makes a determination to transition to an actual traveling state. However, embodiments of the present invention are not limited to this example. Specifically, in another preferred embodiment of the present invention, the neutral control unit 32 is configured to make a determination to transition to an actual traveling state when the vehicle is in a free running state and the driver changes the shift position from the D range to a range other than the D range, e.g., the 2 range or the L range. The neutral control unit 23 may be configured to determine a low shift speed such as the first speed and the second speed with priority as the final target shift speed when the shift position is changed to the 2 range, and configured to determine a low shift speed such as the first speed with priority as the final target shift speed when the shift position is changed to the L range. In such case, switching between the engagement and release of the engagement elements of each target shift speed is not performed on the basis of the rotation speed difference between the input rotation speed and the target input rotation speed as described above, but rather performed based on an elapsed time from the point at which the determination is made to transition to an actual traveling state.

Similarly, according to another preferred embodiment of the present invention, in a transmission apparatus in which a shift speed can be directly selected by a manual shift operation by the driver or the like, the determination to transition to an actual traveling state is made when the selection of a shift speed is received.

(4) In the above-described embodiment, as an example, the neutral control unit 32 transmits the signal for permitting stopping of the engine E to the engine control device 21 when the neutral control condition is established, and transmits the request signal for starting the engine E to the engine control device 21 when the starting condition of the re-engagement control is established. However, embodiments of the present invention are not limited to this example. Specifically, the neutral control unit 32 may be configured to not transmit the signal for permitting stopping of the engine E to the engine control device 21 when the neutral control condition is established, so that the engine E is operated without stopping during the neutral control and the re-engagement control. In such case, the engine E is preferably controlled to maintain an idle rotation speed.

(5) In the above-described embodiment, as an example, the transmission apparatus I includes only the mechanical pump MP as a hydraulic pressure supply source. However, embodiments of the present invention are not limited to this example. Specifically, in addition to the mechanical pump MP, the transmission apparatus 1 may include an auxiliary hydraulic pressure supply source, such as an electric pump or an accumulator, as a hydraulic pressure supply source. The transmission apparatus 1 may supply hydraulic oil to various parts of the transmission apparatus 1 by operating this auxiliary hydraulic pressure supply source while the mechanical pump MP is stopped.

The present invention is well-suited for application to a vehicle transmission apparatus that includes: an input member drive-coupled to an engine; an output member drive-coupled to a wheel; a speed change mechanism that includes a plurality of engagement elements and a plurality of shift speeds selectively formed by controlling the engagement and release of the plurality of engagement elements, and changes a rotation speed of the input member at a speed ratio of one of the shift speeds and transmits the changed rotation speed to the output member; and a control device that controls at least the speed change mechanism.

What is claimed is:
1. A vehicle transmission apparatus comprising:
an input member drive-coupled to an engine;
an output member drive-coupled to a wheel;
a speed change mechanism that includes a plurality of engagement elements and forms a plurality of shift speeds by engagement and release of the plurality of engagement elements, each of the plurality of shift speeds having a speed ratio, respectively, and each of the speed ratios being fixed and unchanging in value, the speed ratios of the plurality of shift speeds being different from each other, the speed change mechanism configured to (i) change a rotation speed of the input member at the speed ration of one of the shift speeds and (ii) transmit the changed rotation speed to the output member; and a control device that is configured to control the speed change mechanism so that the speed change mechanism selectively forms the plurality of shift speeds, wherein when a vehicle is transitioning from a free running state to an actual traveling state by forming one of the shift speeds in accordance with an acceleration request from a driver, the control device is configured to:
  determine an intermediate target shift speed from among the plurality of shift speeds and a final target shift speed from among the plurality of shift speeds, and
  control the speed change mechanism to (i) form the intermediate target shift speed, where the vehicle runs at the intermediate target shift speed, and (ii) change from the intermediate target shift speed to the final target shift speed, where the vehicle runs at the final target shift speed after the change from the intermediate target shift speed to the final target shift speed is completed, the final target shift speed is determined based on at least a vehicle speed and the acceleration request from the driver, and the intermediate target shift speed has an intermediate speed ratio smaller than a final speed ratio of the final target shift speed, each of the intermediate speed ratio and the final speed ratio being one of the speed ratios, and in the free running state, the vehicle is traveling while the speed change mechanism is set to neutral with none of the shift speeds formed.

2. The vehicle transmission apparatus according to claim 1, wherein
the intermediate speed ratio of the intermediate target shift speed is a smallest speed ratio among the speed ratios of the plurality of shift speeds, the shift speed with the smallest speed ratio being a forward shift speed of the vehicle.

3. The vehicle transmission apparatus according to claim 1, wherein
the control device is configured to further determine an additional intermediate target shift speed, which is different from the intermediate target shift speed and has another speed ratio smaller than the final speed ratio of the final target shift, from among the plurality of shift speeds, and perform a control to sequentially form the intermediate target shift speed, the additional intermediate target shift speed and the final target shift speed so that the respective speed ratio increases each time one of the shift speed is changed.

4. The vehicle transmission apparatus according to claim 2, wherein
the control device is configured to further determine an additional intermediate target shift speed, which is different from the intermediate target shift speed and has another speed ratio smaller than the final speed ratio of the final target shift, from among the plurality of shift speeds, and perform a control to sequentially form the intermediate target shift speed, the additional intermediate target shift speed and the final target shift speed so that the respective speed ratio increases each time one of the shift speed is changed.

5. The vehicle transmission apparatus according to claim 1, wherein
when the acceleration request from the driver is received while the vehicle is in the free running state, the control device is configured to make a determination to transition to the actual traveling state.

6. The vehicle transmission apparatus according to claim 2, wherein
when the acceleration request from the driver is received while the vehicle is in the free running state, the control device is configured to make a determination to transition to the actual traveling state.

7. The vehicle transmission apparatus according to claim 6, wherein
when the acceleration request from the driver is received while the vehicle is in the free running state, the control device is configured to make a determination to transition to the actual traveling state.

8. The vehicle transmission apparatus according to claim 1, wherein
when the vehicle is transitioning to the actual traveling state while the engine is in a stopped state with the vehicle in the free running state, the control device is configured to perform a control to start the engine before formation of the intermediate target shift speed.

9. The vehicle transmission apparatus according to claim 2, wherein
when the vehicle is transitioning to the actual traveling state while the engine is in a stopped state with the vehicle in the free running state, the control device is configured to perform a control to start the engine before formation of the intermediate target shift speed.

10. The vehicle transmission apparatus according to claim 6, wherein
when the vehicle is transitioning to the actual traveling state while the engine is in a stopped state with the vehicle in the free running state, the control device is configured to perform a control to start the engine before formation of the intermediate target shift speed.

11. The vehicle transmission apparatus according to claim 9, wherein
when the vehicle is transitioning to the actual traveling state while the engine is in a stopped state with the vehicle in the free running state, the control device is configured to perform a control to start the engine before formation of the intermediate target shift speed.

* * * * *